(12) United States Patent
Bekoscke et al.

(10) Patent No.: US 9,603,762 B2
(45) Date of Patent: *Mar. 28, 2017

(54) WHEELCHAIR SUSPENSION

(71) Applicant: Invacare Corporation, Elyria, OH (US)

(72) Inventors: Robert Bekoscke, Medina, OH (US); Damon Jurkiewicz, Lakewood, OH (US)

(73) Assignee: Invacare Corporation, Elyria, OH (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/446,735

(22) Filed: Jul. 30, 2014

(65) Prior Publication Data
US 2014/0339005 A1 Nov. 20, 2014

Related U.S. Application Data

(63) Continuation of application No. 13/568,623, filed on Aug. 7, 2012, now Pat. No. 8,794,359, which is a (Continued)

(51) Int. Cl.
A61G 5/04 (2013.01)
A61G 5/06 (2006.01)
(Continued)

(52) U.S. Cl.
CPC ............ *A61G 5/043* (2013.01); *A61G 5/04* (2013.01); *A61G 5/045* (2013.01); *A61G 5/06* (2013.01);
(Continued)

(58) Field of Classification Search
CPC .......... A61G 5/043; A61G 5/045; A61G 5/06; A61G 5/10; A61G 5/04; A61G 2005/1089;
(Continued)

(56) References Cited

U.S. PATENT DOCUMENTS 865,514 A 9/1907 Mullenmeister
1,116,086 A 11/1914 Lewis
(Continued)

FOREIGN PATENT DOCUMENTS

CA 2254372 5/2000
DE 152186 9/1903
(Continued)

OTHER PUBLICATIONS

"All-Terrain Wheelchair, Designer's Corner", Design News, Feb. 24, 1992, cover page and p. 54.
(Continued)

*Primary Examiner* — Toan To
(74) *Attorney, Agent, or Firm* — Calfee, Halter & Griswold LLP

(57) ABSTRACT

A suspension for a vehicle is provided. The suspension includes, for example, a frame, at least one drive assembly and at least one caster pivot arm. The at least one drive assembly and the at least one caster pivot arm are pivotally connected to the frame at a common pivot axis such that the drive assembly and the front caster pivot arm are pivotable relative to one another.

6 Claims, 36 Drawing Sheets

Related U.S. Application Data continuation of application No. 12/523,630, filed as application No. PCT/US2008/052878 on Feb. 4, 2008, now Pat. No. 8,272,461.

(60) Provisional application No. 60/900,137, filed on Feb. 8, 2007.

(51) Int. Cl.
  *A61G 5/10* (2006.01)
  *B60G 3/20* (2006.01)

(52) U.S. Cl.
  CPC ........ *A61G 5/10* (2013.01); *A61G 2005/1078* (2013.01); *A61G 2005/1089* (2013.01); *A61G 2203/14* (2013.01); *B60G 3/207* (2013.01); *Y10S 180/907* (2013.01)

(58) Field of Classification Search
  CPC ........ A61G 2203/14; A61G 2005/1078; Y10S 180/907; B60G 3/207
  USPC .................. 180/65.1, 907; 280/124.104, 755
  See application file for complete search history.

(56) References Cited

U.S. PATENT DOCUMENTS

| | | |
|---|---|---|
| 1,151,414 A | 8/1915 | Steinbach |
| 1,773,254 A | 9/1930 | Becker |
| 1,973,627 A | 9/1934 | Harter |
| 2,398,211 A | 4/1946 | du Pont |
| 2,427,482 A | 9/1947 | Wiessman |
| 2,767,995 A | 10/1956 | Stout |
| 2,949,153 A | 8/1960 | Hickman |
| 2,986,200 A | 5/1961 | Nobile |
| 3,104,112 A | 9/1963 | Crail |
| 3,174,176 A | 3/1965 | Olson |
| 3,191,990 A | 6/1965 | Rugg et al. |
| 3,195,670 A | 7/1965 | Dunn |
| 3,210,092 A | 10/1965 | Kraus et al. |
| 3,282,605 A | 11/1966 | Nihlean et al. |
| 3,314,672 A | 4/1967 | Persson |
| 3,506,079 A | 4/1970 | Madler et al. |
| 3,573,877 A | 4/1971 | Locke |
| 3,580,591 A | 5/1971 | Coffey |
| 3,589,700 A | 6/1971 | Ruet et al. |
| 3,592,282 A | 7/1971 | Soileau |
| 3,602,522 A | 8/1971 | Zamotin |
| 3,618,968 A | 11/1971 | Greer |
| 3,627,157 A | 12/1971 | Blatchly |
| 3,661,228 A | 5/1972 | Glasser |
| 3,664,450 A | 5/1972 | Udden et al. |
| 3,682,462 A | 8/1972 | Papousek |
| 3,689,103 A | 9/1972 | Meulendyk |
| 3,709,313 A | 1/1973 | James |
| 3,848,883 A | 11/1974 | Breacain |
| 3,862,751 A | 1/1975 | Schwaller |
| 3,876,012 A | 4/1975 | Regier |
| 3,881,773 A | 5/1975 | Rodaway |
| 3,883,153 A | 5/1975 | Singh et al. |
| 3,893,529 A | 7/1975 | Karchak, Jr. et al. |
| 3,901,337 A | 8/1975 | Cragg |
| 3,901,527 A | 8/1975 | Danziger et al. |
| 3,905,437 A | 9/1975 | Kaiho et al. |
| 3,917,312 A | 11/1975 | Rodaway |
| 3,930,551 A | 1/1976 | Cragg |
| 3,952,822 A | 4/1976 | Udden et al. |
| 3,953,054 A | 4/1976 | Udden et al. |
| 3,976,152 A | 8/1976 | Bell |
| 4,078,817 A | 3/1978 | Ferguson et al. |
| 4,108,449 A | 8/1978 | Rhodes |
| 4,118,020 A | 10/1978 | Myers |
| 4,119,163 A | 10/1978 | Ball |
| 4,128,137 A | 12/1978 | Booth |
| 4,190,263 A | 2/1980 | Powers |
| 4,222,449 A | 9/1980 | Feliz |
| 4,245,847 A | 1/1981 | Knott |
| 4,247,125 A | 1/1981 | Rayment |
| 4,264,085 A | 4/1981 | Volin |
| 4,310,167 A | 1/1982 | McLaurin |
| 4,333,681 A | 6/1982 | Nelson |
| 4,337,958 A | 7/1982 | Witt et al. |
| 4,341,278 A | 7/1982 | Meyer |
| 4,375,295 A | 3/1983 | Volin |
| 4,387,325 A | 6/1983 | Klimo |
| 4,405,142 A | 9/1983 | Whetstine |
| 4,436,320 A | 3/1984 | Brudermann et al. |
| 4,437,678 A | 3/1984 | Schultz |
| 4,455,029 A | 6/1984 | Taylor |
| 4,455,031 A | 6/1984 | Hosaka |
| 4,456,295 A | 6/1984 | Francu |
| 4,483,407 A | 11/1984 | Iwamoto et al. |
| 4,500,102 A | 2/1985 | Haury et al. |
| 4,513,832 A | 4/1985 | Engman |
| 4,515,385 A | 5/1985 | Christian |
| 4,542,918 A | 9/1985 | Singleton |
| 4,545,593 A | 10/1985 | Farnam |
| 4,545,616 A | 10/1985 | Booth |
| 4,556,229 A | 12/1985 | Bihler et al. |
| 4,565,385 A | 1/1986 | Morford |
| 4,592,570 A | 6/1986 | Nassiri |
| RE32,242 E | 9/1986 | Minnebraker |
| 4,618,155 A | 10/1986 | Jayne |
| 4,641,848 A | 2/1987 | Ayers |
| 4,655,471 A | 4/1987 | Peek |
| 4,687,068 A | 8/1987 | Pagett |
| 4,720,223 A | 1/1988 | Neights et al. |
| 4,721,321 A | 1/1988 | Haury et al. |
| 4,721,322 A | 1/1988 | Hawkins |
| 4,730,842 A | 3/1988 | Summers et al. |
| 4,736,983 A | 4/1988 | Furbee |
| 4,759,418 A | 7/1988 | Goldenfeld et al. |
| 4,763,910 A | 8/1988 | Brandli et al. |
| 4,805,712 A | 2/1989 | Singleton |
| 4,805,925 A | 2/1989 | Haury et al. |
| 4,811,966 A | 3/1989 | Singleton |
| 4,823,900 A | 4/1989 | Farnam |
| 4,826,194 A | 5/1989 | Sakita |
| 4,840,394 A | 6/1989 | Bickler |
| 4,861,056 A | 8/1989 | Duffy, Jr. et al. |
| 4,862,983 A | 9/1989 | Kreft |
| 4,886,294 A | 12/1989 | Nahachewski |
| 4,905,972 A | 3/1990 | Scowen |
| 4,919,441 A | 4/1990 | Marier et al. |
| 4,926,952 A | 5/1990 | Farnam |
| 4,934,626 A | 6/1990 | Kimura |
| 4,951,766 A | 8/1990 | Basedow et al. |
| 4,962,942 A | 10/1990 | Barnett et al. |
| 4,967,864 A | 11/1990 | Boyer et al. |
| 4,989,890 A | 2/1991 | Lockard et al. |
| 5,020,816 A | 6/1991 | Mulholland |
| 5,042,607 A | 8/1991 | Falkenson et al. |
| 5,044,647 A | 9/1991 | Patterson |
| 5,044,648 A | 9/1991 | Knapp |
| 5,076,390 A | 12/1991 | Haskins |
| 5,076,602 A | 12/1991 | Robertson et al. |
| 5,113,959 A | 5/1992 | Mastov et al. |
| 5,123,495 A | 6/1992 | Littlejohn et al. |
| 5,125,468 A | 6/1992 | Coker |
| 5,137,295 A | 8/1992 | Peek |
| 5,156,226 A | 10/1992 | Boyer et al. |
| 5,176,393 A | 1/1993 | Robertson et al. |
| 5,180,025 A | 1/1993 | Yeh et al. |
| 5,180,275 A | 1/1993 | Czech et al. |
| 5,181,133 A | 1/1993 | Lipton |
| 5,181,733 A | 1/1993 | Tague |
| 5,183,133 A | 2/1993 | Roy et al. |
| 5,197,559 A | 3/1993 | Garin, III et al. |
| 5,203,610 A | 4/1993 | Miller |
| 5,209,509 A | 5/1993 | Gay et al. |
| 5,222,567 A | 6/1993 | Broadhead et al. |
| 5,228,709 A | 7/1993 | Kao |
| 5,230,522 A | 7/1993 | Gehlsen et al. |
| 5,241,876 A | 9/1993 | Mathis |

(56) References Cited

U.S. PATENT DOCUMENTS

| | | |
|---|---|---|
| 5,248,007 A | 9/1993 | Watkins et al. |
| 5,290,055 A | 3/1994 | Treat, Jr. |
| 5,294,141 A | 3/1994 | Mentessi et al. |
| 5,297,021 A | 3/1994 | Koerlin et al. |
| 5,301,964 A | 4/1994 | Papac |
| 5,316,328 A | 5/1994 | Bussinger |
| 5,341,533 A | 8/1994 | Seitz |
| 5,351,774 A | 10/1994 | Okamoto |
| 5,366,037 A | 11/1994 | Richey |
| 5,372,211 A | 12/1994 | Wilcox et al. |
| 5,403,031 A | 4/1995 | Gottschalk et al. |
| 5,419,571 A | 5/1995 | Vaughan |
| 5,435,404 A | 7/1995 | Garin, III |
| 5,447,317 A | 9/1995 | Gehlsen et al. |
| 5,464,271 A | 11/1995 | McFarland |
| 5,467,838 A | 11/1995 | Wu |
| 5,482,261 A | 1/1996 | Ortega |
| 5,485,140 A | 1/1996 | Bussin |
| 5,489,139 A | 2/1996 | McFarland |
| 5,513,875 A | 5/1996 | Tahara et al. |
| 5,518,081 A | 5/1996 | Thibodeau |
| 5,531,284 A | 7/1996 | Okamoto |
| 5,540,297 A | 7/1996 | Meier |
| 5,562,172 A | 10/1996 | Mick |
| 5,564,512 A | 10/1996 | Scheulderman |
| 5,575,348 A | 11/1996 | Goertzen et al. |
| 5,611,555 A | 3/1997 | Vidal |
| 5,628,377 A | 5/1997 | LaGloan |
| 5,701,122 A | 12/1997 | Canedy |
| 5,727,802 A | 3/1998 | Garven, Jr. et al. |
| 5,727,809 A | 3/1998 | Ordelman et al. |
| 5,762,155 A | 6/1998 | Scheulderman |
| 5,772,048 A | 6/1998 | Sopcisak |
| 5,772,226 A | 6/1998 | Bobichon |
| 5,772,237 A | 6/1998 | Finch et al. |
| D397,645 S | 9/1998 | Schaffner |
| 5,833,248 A | 11/1998 | Eguchi |
| 5,848,658 A | 12/1998 | Pulver |
| 5,851,018 A | 12/1998 | Curran et al. |
| 5,851,019 A | 12/1998 | Gill et al. |
| 5,853,059 A | 12/1998 | Goertzen et al. |
| D404,693 S | 1/1999 | Schaffner et al. |
| 5,855,387 A * | 1/1999 | Gill .................. A61G 5/10 280/250.1 |
| 5,899,475 A | 5/1999 | Verhaeg et al. |
| 5,904,214 A | 5/1999 | Lin |
| 5,921,532 A | 7/1999 | Pierce et al. |
| 5,944,131 A | 8/1999 | Schaffner et al. |
| 5,954,351 A | 9/1999 | Koschinat |
| 5,957,474 A | 9/1999 | Mundy et al. |
| 5,964,473 A | 10/1999 | Degonda et al. |
| 5,988,304 A | 11/1999 | Behrents |
| 5,996,716 A | 12/1999 | Montiglio et al. |
| 6,003,624 A | 12/1999 | Jorgensen et al. |
| 6,029,763 A | 2/2000 | Swisher |
| 6,041,876 A | 3/2000 | Pulver et al. |
| 6,047,979 A | 4/2000 | Kraft et al. |
| 6,062,600 A | 5/2000 | Kamen et al. |
| 6,068,280 A | 5/2000 | Torres |
| 6,070,898 A | 6/2000 | Dickie et al. |
| 6,073,951 A | 6/2000 | Jindra et al. |
| 6,079,698 A | 6/2000 | Patterson et al. |
| 6,079,725 A | 6/2000 | Lazaros |
| D429,665 S | 8/2000 | Dickie |
| 6,095,271 A | 8/2000 | Dickie et al. |
| 6,129,165 A | 10/2000 | Schaffner et al. |
| 6,131,679 A | 10/2000 | Pulver et al. |
| 6,135,222 A | 10/2000 | Furukawa |
| 6,161,856 A | 12/2000 | Peterson |
| 6,168,178 B1 | 1/2001 | Garven, Jr. et al. |
| 6,176,335 B1 | 1/2001 | Schaffner et al. |
| 6,179,076 B1 | 1/2001 | Fernie et al. |
| 6,186,252 B1 | 2/2001 | Schaffner et al. |
| 6,196,343 B1 | 3/2001 | Strautnieks |
| 6,199,647 B1 | 3/2001 | Schaffner et al. |
| 6,206,119 B1 | 3/2001 | Wu |
| 6,209,670 B1 | 4/2001 | Fernie et al. |
| 6,217,114 B1 | 4/2001 | Degonda |
| 6,225,894 B1 | 5/2001 | Kyrtsos |
| 6,234,263 B1 | 5/2001 | Boivin et al. |
| 6,234,507 B1 | 5/2001 | Dickie et al. |
| 6,241,275 B1 | 6/2001 | Slagerman |
| 6,264,218 B1 | 7/2001 | Slagerman |
| 6,279,927 B1 | 8/2001 | Nishihira et al. |
| 6,312,000 B1 | 11/2001 | Pauls et al. |
| 6,322,089 B1 | 11/2001 | Dantele et al. |
| 6,341,657 B1 | 1/2002 | Hopely et al. |
| 6,341,671 B1 | 1/2002 | Ebersole |
| 6,347,688 B1 | 2/2002 | Hall et al. |
| 6,357,793 B1 | 3/2002 | Dickie et al. |
| 6,375,209 B1 | 4/2002 | Schlangen |
| 6,394,738 B1 | 5/2002 | Springer |
| 6,405,816 B1 | 6/2002 | Kamen et al. |
| 6,425,597 B1 | 7/2002 | Peterson |
| 6,428,020 B1 | 8/2002 | Steadman |
| 6,428,029 B1 | 8/2002 | Barclay |
| 6,429,541 B2 | 8/2002 | Takenaka et al. |
| 6,454,286 B1 | 9/2002 | Hosino |
| 6,460,641 B1 | 10/2002 | Kral |
| 6,460,869 B1 | 10/2002 | Tremouilles |
| 6,494,474 B1 | 12/2002 | Kramer, Jr. |
| 6,533,305 B1 | 3/2003 | Falk |
| 6,533,306 B2 | 3/2003 | Watkins |
| 6,543,564 B1 | 4/2003 | Kamen et al. |
| 6,543,798 B2 | 4/2003 | Schaffner et al. |
| 6,554,086 B1 | 4/2003 | Goertzen et al. |
| 6,568,030 B1 | 5/2003 | Watanabe et al. |
| 6,581,711 B1 | 6/2003 | Tuluie |
| 6,588,799 B1 | 7/2003 | Sanchez |
| 6,601,863 B1 | 8/2003 | Mentessi et al. |
| 6,640,916 B2 | 11/2003 | Schaffner et al. |
| 6,684,969 B1 | 2/2004 | Flowers et al. |
| 6,688,437 B2 | 2/2004 | Usherovich |
| 6,702,306 B1 | 3/2004 | Ockwell |
| 6,712,369 B2 | 3/2004 | Wu |
| 6,715,845 B2 | 4/2004 | Kamen et al. |
| D491,115 S | 6/2004 | Taylor |
| 6,776,430 B2 | 8/2004 | White et al. |
| 6,851,711 B2 | 2/2005 | Goertzen et al. |
| 6,857,490 B2 | 2/2005 | Quigg |
| 6,923,278 B2 | 8/2005 | Mulhern et al. |
| 6,923,280 B2 | 8/2005 | Goertzen et al. |
| 6,935,448 B2 | 8/2005 | Goertzen et al. |
| 6,938,923 B2 | 9/2005 | Mulhern et al. |
| 7,021,641 B2 | 4/2006 | Wu |
| 7,040,429 B2 | 5/2006 | Molnar et al. |
| 7,055,634 B2 | 6/2006 | Molnar |
| 7,066,290 B2 | 6/2006 | Fought |
| 7,083,195 B2 | 8/2006 | Goertzen et al. |
| 7,100,716 B2 | 9/2006 | Engels et al. |
| 7,175,193 B2 | 2/2007 | Wu |
| 7,219,755 B2 | 5/2007 | Goertzen et al. |
| 7,219,924 B2 | 5/2007 | Mulhern et al. |
| 7,232,008 B2 | 6/2007 | Levi et al. |
| 7,234,554 B2 | 6/2007 | Mulhern et al. |
| 7,264,272 B2 | 9/2007 | Mulhern et al. |
| 7,273,118 B2 | 9/2007 | Huang |
| 7,293,801 B2 | 11/2007 | Bertrand et al. |
| 7,316,282 B2 | 1/2008 | Mulhern et al. |
| 7,370,876 B2 | 5/2008 | Hsu et al. |
| 7,374,002 B2 | 5/2008 | Fought |
| 7,380,824 B2 | 6/2008 | Chen et al. |
| 7,389,835 B2 | 6/2008 | Mulhern et al. |
| 7,398,842 B2 | 7/2008 | Fontecchio et al. |
| 7,413,038 B2 | 8/2008 | Mulhern et al. |
| 7,461,897 B2 | 12/2008 | Kruse et al. |
| 7,472,767 B2 | 1/2009 | Molnar |
| 7,490,683 B2 | 2/2009 | Schaffner |
| 7,506,709 B2 | 3/2009 | Kiwak et al. |
| 7,516,984 B2 | 4/2009 | Tang |
| 6,196,343 C1 | 7/2009 | Strautnieks |
| 7,556,109 B2 * | 7/2009 | Chen .................. A61G 5/043 180/65.1 |
| 7,597,163 B2 | 10/2009 | Goertzen et al. |

(56) References Cited

U.S. PATENT DOCUMENTS

| | | | |
|---|---|---|---|
| 7,735,591 B2 | 6/2010 | Puskar-Pasewicz et al. | |
| 7,766,106 B2 | 8/2010 | Puskar-Pasewicz et al. | |
| 7,775,307 B2 * | 8/2010 | Cheng | A61G 5/043 180/22 |
| 7,828,310 B2 | 11/2010 | Vreeswijk et al. | |
| D632,229 S | 2/2011 | Kruse | |
| 7,882,909 B2 | 2/2011 | Pearlman et al. | |
| 7,896,394 B2 * | 3/2011 | Jackson | A61G 5/043 180/65.1 |
| 8,037,953 B2 | 10/2011 | Puskar-Pasewicz et al. | |
| 8,113,531 B2 | 2/2012 | Zhou | |
| 8,118,321 B2 | 2/2012 | Hunziker et al. | |
| 8,172,015 B2 | 5/2012 | Molnar | |
| 8,172,016 B2 | 5/2012 | Goertzen et al. | |
| 8,177,257 B2 | 5/2012 | Dugas et al. | |
| 8,186,463 B2 | 5/2012 | Hunziker et al. | |
| 8,210,556 B2 | 7/2012 | Zhou et al. | |
| 8,272,461 B2 | 9/2012 | Bekoscke et al. | |
| 8,286,738 B2 | 10/2012 | Cheng | |
| 8,297,388 B2 | 10/2012 | Lindenkamp et al. | |
| 8,573,341 B2 | 11/2013 | Fought et al. | |
| 8,910,975 B2 | 12/2014 | Bekoscke et al. | |
| 9,010,470 B2 * | 4/2015 | Cuson | A61G 5/06 180/65.31 |
| 2001/0011613 A1 | 8/2001 | Schaffner et al. | |
| 2001/0013437 A1 | 8/2001 | Husted et al. | |
| 2002/0023787 A1 | 2/2002 | Kamen et al. | |
| 2002/0088657 A1 | 7/2002 | Brett et al. | |
| 2002/0175027 A1 | 11/2002 | Usherovich | |
| 2003/0030243 A1 | 2/2003 | Engels et al. | |
| 2003/0075365 A1 | 4/2003 | Fought | |
| 2003/0122332 A1 | 7/2003 | Engels et al. | |
| 2003/0168264 A1 | 9/2003 | Goertzen et al. | |
| 2003/0168265 A1 | 9/2003 | Goertzen et al. | |
| 2003/0201632 A1 | 10/2003 | Mulhern et al. | |
| 2003/0205420 A1 | 11/2003 | Mulhern et al. | |
| 2004/0004342 A1 | 1/2004 | Mulhern et al. | |
| 2004/0032119 A1 | 2/2004 | Tran et al. | |
| 2004/0060748 A1 | 4/2004 | Molnar | |
| 2004/0084230 A1 | 5/2004 | Grymko et al. | |
| 2004/0094944 A1 | 5/2004 | Goertzen et al. | |
| 2004/0144580 A1 | 7/2004 | Wu | |
| 2004/0150204 A1 | 8/2004 | Goertzen et al. | |
| 2004/0159476 A1 | 8/2004 | Molnar | |
| 2004/0168839 A1 | 9/2004 | Wu | |
| 2004/0188152 A1 | 9/2004 | Schaffner | |
| 2004/0232683 A1 | 11/2004 | Mulhern | |
| 2004/0262859 A1 | 12/2004 | Turturiello | |
| 2005/0034903 A1 | 2/2005 | Wu | |
| 2005/0077694 A1 | 4/2005 | Levi et al. | |
| 2005/0077714 A1 | 4/2005 | Mulhern et al. | |
| 2005/0077715 A1 | 4/2005 | Mulhern et al. | |
| 2005/0127631 A1 | 6/2005 | Schaffner | |
| 2005/0151360 A1 | 7/2005 | Bertrand et al. | |
| 2005/0206124 A1 | 9/2005 | Levi | |
| 2005/0206149 A1 * | 9/2005 | Mulhern | A61G 5/043 280/755 |
| 2005/0225040 A1 | 10/2005 | Goertzen et al. | |
| 2005/0225041 A1 | 10/2005 | Longino | |
| 2006/0021806 A1 | 2/2006 | Goertzen et al. | |
| 2006/0076747 A1 | 4/2006 | Pauls et al. | |
| 2006/0076748 A1 | 4/2006 | Pauls et al. | |
| 2006/0082117 A1 | 4/2006 | Turturiellox | |
| 2006/0086554 A1 | 4/2006 | Jackson et al. | |
| 2006/0201723 A1 | 9/2006 | Hsu et al. | |
| 2006/0213705 A1 | 9/2006 | Molnar | |
| 2006/0244249 A1 | 11/2006 | Goertzen et al. | |
| 2006/0249317 A1 | 11/2006 | Fought | |
| 2006/0255581 A1 | 11/2006 | Goertzen et al. | |
| 2006/0266565 A1 | 11/2006 | Fontecchio et al. | |
| 2007/0018418 A1 | 1/2007 | Huang | |
| 2007/0023209 A1 | 2/2007 | Wu | |
| 2007/0039766 A1 | 2/2007 | Jackson et al. | |
| 2007/0080003 A1 | 4/2007 | Koerlin et al. | |
| 2007/0095582 A1 | 5/2007 | Stuijt et al. | |
| 2007/0107955 A1 | 5/2007 | Puskar-Pasewicz et al. | |
| 2007/0181353 A1 | 8/2007 | Puskar-Pasewicz et al. | |
| 2007/0209848 A1 | 9/2007 | Tang | |
| 2008/0053720 A1 | 3/2008 | Chen et al. | |
| 2008/0083573 A1 | 4/2008 | Tseng | |
| 2008/0087481 A1 | 4/2008 | Grymko et al. | |
| 2008/0157513 A1 | 7/2008 | Cheng | |
| 2008/0208394 A1 | 8/2008 | Fought | |
| 2009/0091092 A1 | 4/2009 | Molnar | |
| 2009/0121532 A1 | 5/2009 | Kruse et al. | |
| 2009/0145677 A1 | 6/2009 | Zhou | |
| 2009/0295119 A1 | 12/2009 | Bloswich | |
| 2010/0004820 A1 | 1/2010 | Bekoscke et al. | |
| 2010/0013172 A1 | 1/2010 | Goertzen | |
| 2010/0065346 A1 | 3/2010 | Porcheron | |
| 2010/0084209 A1 | 4/2010 | Bekoscke et al. | |
| 2010/0102529 A1 | 4/2010 | Lindenkamp et al. | |
| 2010/0301576 A1 | 12/2010 | Dugas et al. | |
| 2011/0083913 A1 | 4/2011 | Cuson et al. | |
| 2011/0215540 A1 | 9/2011 | Hunziker | |
| 2012/0217070 A1 | 8/2012 | Goertzen | |
| 2012/0217713 A1 | 8/2012 | Molnar | |
| 2012/0299262 A1 | 11/2012 | Bekoscke | |
| 2013/0207364 A1 | 8/2013 | Bekoscke et al. | |

FOREIGN PATENT DOCUMENTS

| | | |
|---|---|---|
| DE | 2256934 | 5/1973 |
| DE | 1399822 | 8/1977 |
| DE | 19806500 | 3/2002 |
| DE | 10136368 | 5/2003 |
| DE | 10136368 | 5/2003 |
| EP | 18101 | 10/1980 |
| EP | 127929 | 12/1984 |
| EP | 268960 | 6/1988 |
| EP | 312969 | 4/1989 |
| EP | 339500 | 11/1989 |
| EP | 369791 | 5/1990 |
| EP | 419085 | 3/1991 |
| EP | 445171 | 9/1991 |
| EP | 511113 | 10/1992 |
| EP | 677285 | 10/1995 |
| EP | 702945 | 3/1996 |
| EP | 829247 | 3/1998 |
| EP | 841052 | 5/1998 |
| EP | 908165 | 4/1999 |
| EP | 908166 | 4/1999 |
| EP | 927551 | 7/1999 |
| EP | 988848 | 3/2000 |
| EP | 1147969 | 10/2001 |
| EP | 1279391 | 1/2003 |
| EP | 1279392 | 1/2003 |
| EP | 1434345 | 7/2004 |
| EP | 1479362 | 11/2004 |
| EP | 1513479 | 3/2005 |
| EP | 1522292 | 4/2005 |
| EP | 1522295 | 4/2005 |
| EP | 1582189 | 10/2005 |
| EP | 2226048 | 9/2010 |
| EP | 2111204 | 4/2011 |
| FR | 27505 | 7/1924 |
| FR | 2215054 | 8/1974 |
| FR | 2399822 | 3/1979 |
| FR | 2455886 | 12/1980 |
| FR | 2498925 | 8/1982 |
| FR | 2738147 | 7/1997 |
| FR | 2749502 | 12/1997 |
| FR | 2858764 | 2/2005 |
| GB | 151915 | 10/1920 |
| GB | 154369 | 12/1920 |
| GB | 265885 | 2/1927 |
| GB | 474349 | 10/1937 |
| GB | 841175 | 7/1960 |
| GB | 1503910 | 3/1978 |
| GB | 2040237 | 8/1980 |
| GB | 2061197 | 5/1981 |
| GB | 2141980 | 1/1985 |
| GB | 2224980 | 5/1990 |
| JP | 57-186589 | 11/1982 |

(56) References Cited

FOREIGN PATENT DOCUMENTS

| | | |
|---|---|---|
| JP | 03-011978 | 12/1989 |
| JP | 04-158864 | 6/1992 |
| JP | 07-328073 | 12/1995 |
| JP | 08-038552 | 2/1996 |
| JP | 410248877 | 9/1998 |
| JP | 11059506 | 3/1999 |
| JP | 2000 102569 | 4/2000 |
| JP | 2000 288032 | 10/2000 |
| JP | 2001 070347 | 3/2001 |
| JP | 2001 104391 | 4/2001 |
| JP | 2001 212181 | 8/2001 |
| JP | 2001 258948 | 9/2001 |
| JP | 2001 327545 | 11/2001 |
| JP | 2002 143223 | 5/2002 |
| JP | 2002 165841 | 6/2002 |
| JP | 2004 202264 | 7/2004 |
| SE | 431393 | 11/1983 |
| WO | 82/00445 | 2/1982 |
| WO | 84/04451 | 11/1984 |
| WO | 87/06205 | 4/1987 |
| WO | 89/06117 | 7/1989 |
| WO | 90/05515 | 5/1990 |
| WO | 90/06097 | 6/1990 |
| WO | 92/09463 | 6/1992 |
| WO | 93/24342 | 12/1993 |
| WO | 94/13241 | 6/1994 |
| WO | 94/15567 | 7/1994 |
| WO | 96/15752 | 5/1996 |
| WO | 97/44206 | 11/1997 |
| WO | 98/46184 | 10/1998 |
| WO | 99/17700 | 4/1999 |
| WO | 00/08910 | 2/2000 |
| WO | 00/09356 | 2/2000 |
| WO | 00/12040 | 3/2000 |
| WO | 00/54718 | 9/2000 |
| WO | 00/66060 | 11/2000 |
| WO | 01/01914 | 1/2001 |
| WO | 02/34190 | 5/2002 |
| WO | 03/030800 | 4/2003 |
| WO | 03/034969 | 5/2003 |
| WO | 03/049664 | 6/2003 |
| WO | 03/101364 | 12/2003 |
| WO | 2004/016451 | 2/2004 |
| WO | 2004/037569 | 5/2004 |
| WO | 2007/011668 | 1/2007 |
| WO | 2007/079346 | 7/2007 |
| WO | 2008/124953 | 3/2008 |
| WO | 2008/084462 | 7/2008 |
| WO | 2008/097879 | 8/2008 |
| WO | 2008/100759 | 8/2008 |

OTHER PUBLICATIONS

"Big Bounder Power Wheelchair: Conventional "Tubular" Style Frame"; http://www.wheelchair.com/bigbounderpage.htm, Accessed on the World Wide Web on Dec. 17, 2003, p. 1-4.
"Bounder Plus Power Wheelchair: Convention "Tubular" Style Frame"; http://www.wheelchairs.com/plus.htm, Accessed on the World Wide Web on Dec. 17, 2003, p. 1-4.
"Frog Legs: Smooth Ride Ahead"; http://www.froglegsinc.com/index.php, Accessed on the World Wide Web on Dec. 17, 2003, p. 105.
"Frog Legs Tires", http://mdtap.org/tt/1999.09/prod.html, Accessed on the World Wide Web on Dec. 17, 2003, p. 1-3.
Golden Technologies advertisement video http://youtube/TyEvrmoaHME.
"Invacare pronto M7I jr. Power Wheelchair Manual"; Accessed on the World Wide Web on Dec. 17, 2003.
"Invacare Storm Series TDX Power Wheelchairs Manual"; Accessed on the World Wide Web on Dec. 17, 2003, p. 1-24.
"Invacare Xterra Series GT Power Wheelchair Manual", Accessed on the World Wide Web on Dec. 17, 2003, p. 1-4.
"Jazzy 1122", Pride Mobile Products Corp., Accessed on the World Wide Web on Dec. 17, 2003, p. 1-2.
"Jazzy 1133", Pride Mobile Products Corp., Accessed on the World Wide Web on Dec. 17, 2003, p. 1-2.
"Jazzy 1170XL", Pride Mobile Products Corp., Accessed on the World Wide Web on Dec. 17, 2003, p. 1-2.
Kauzlarich, J. et al., "Wheelchair Caster Shimmy II: Damping", Journal for Rehabilitative Research and Development, May/Jun. 2000, vol. 37, No. 3, pp. 305-314.
McLauren, C., "Future Developments—Current Directions in Wheelchair Research", Journal for Rehabilitative Research and Development, Jul./Aug. 1985, vol. 42, No. 4 Suppl. No. 2, pp. 88-99.
"Bruno Independent Living Aids ISP 9001 Certified"; http://www.bruno.com/power_chairs.htm, Accessed on the World Wide Web on Dec. 17, 2003, p. 1-5.
"Top End Terminator SS Sports Wheelchair", http://phc-online.com/terminator_ss.htm, Accessed on the World Wide Web on Dec. 17, 2003, p. 1-5.
"Transactions of the Institute of Measurement and Control", The British Library of Science Technology and Business, vol. 24, Nov. 5, 2002, 15 pgs.
M.J. Lawn, et al., "Modeling of a Stair-Climbing Wheelchair Mechanism with High Single-Step Capability", IEEE Transactions on Neutral Systems and Rehabilitation Engineering, vol. 11, No. 3, Sep. 2003, pp. 323-332.
Quickie G-424 User Instruction Manual & Warranty, 930484 Rev. A (27 sheets).
10 photographs (8.5×11) of Quickie G-424 Wheelchair obtained Nov. 24, 2004.
Sunrise Medical, Inc., Power Products Parts Manual, 930307 Rev. K (264 double sided sheets), Jul. 2004.
Permobil Chairman HD3 Owner's Manual dated May 2003, 52 pages.
Permobil C400 Power Wheelchair, Owner's Manual, version 6, 2010, Permobil AB, Sweden, 100 pgs.
Permobil C500 Power Wheelchair, Owner's Manual, version 6, 2010, Permobil AB, Sweden, 100 pgs.
Pride Mobility, Jet 3 Ultra Owner's Manual dated Jun. 2007, 43 pages.
Quantum Series Owner's Manual dated Feb. 2009, 43 pages.
"Bike" magazine article, "Ten Underrated Products You Probably Don't Own but Maybe Shoud" (in part), Jan. 1994, pp. 82 and 83.
"Bike" magazine article "Softride Contour", Mar. 1994, pp. 64-65.
"Mountain Bike Action", picture and caption describing "Body Shock", Jan. 1994, pp. 48.
International Search Report from PCT/US98/07543 dated Aug. 19, 1998 which cites FR 2399822.
International Search Report from PCT/US01/42656 dated Jan. 14, 2003.
International Search Report from PCT/US02/29996 dated Jun. 24, 2003, 2 pgs.
International Preliminary Examination Report from PCT/US02/29996 dated Dec. 11, 2003.
International Search Report from PCT/US02/29998 dated Dec. 12, 2002.
International Preliminary Examination Report from PCT/US02/29998 dated Jan. 13, 2004.
International Search Report and Written Opinion from PCT/US03/25736 dated Dec. 28, 2004.
International Search Report from PCT/US03/34124 dated Dec. 28, 2004.
International Preliminary Examination Report from PCT/US03/34124 dated Aug. 25, 2006.
International Search Report and Written Opinion from PCT/IB08/050111 dated Jun. 4, 2008.
Amendments under Article 34(2)(b) PCT and Comments from PCT/IB08/050111 dated Oct. 2, 2008.
International Preliminary Report on Patentability for International Patent Application No. PCT/IB08/050111 dated Apr. 22, 2009.
International Search Report from and Written Opinion from PCT/US08/52878 dated Jul. 3, 2008.

(56) References Cited

OTHER PUBLICATIONS

International Search Report and Written Opinion from PCT/US08/53242 dated Sep. 3, 2008.
International Search Report and Written Opinion from PCT/US10/51888 dated Dec. 6, 2010.
International Search Report and Written Opinion for PCT/US13/026441 dated Apr. 23, 2013.
Office action mailed Feb. 2, 2006 from Control No. 90/007,491.
Interview Summary from Control No. 90/007,491 dated Mar. 23, 2006.
Statement as to the substance of an Interview from Control No. 90/007,491 Apr. 3, 2006.
Response from Control No. 90/007,491 dated Apr. 3, 2006.
Office action mailed Jul. 5, 2006 from Control No. 90/007,491.
Response to Office action from Control No. 90/007,491 dated Sep. 11, 2006.
Office action mailed Sep. 21, 2006 from Control No. 90/007,491.
Response from Control No. 90/007,491 dated Nov. 9, 2006.
Notice of Appeal from Control No. 90/007,491 dated Nov. 9, 2006.
Advisory action from Control No. 90/007,491 dated Nov. 22, 2006.
Appeal Brief from Control No. 90/007,491 dated Jan. 16, 2007.
Advisory action from Control No. 90/007,491 dated Apr. 20, 2007.
Amended Appeal Brief from Control No. 90/007,491 dated Jun. 29, 2007.
Examiner's Answer from Control No. 90/007,491 dated Sep. 24, 2007.
Reply Brief from Control No. 90/007,491 dated Nov. 21, 2007.
Supplemental Examiner's Answer from Control No. 90/007,491 dated Dec. 18, 2007.
Request for Oral Hearing from Control No. 90/007,491 dated Feb. 19, 2008.
Reply Brief from Control No. 90/007,491 dated Feb. 19, 2008.
Office communication from Control No. 90/007,491 dated Mar. 14, 2008.
Office communication from Control No. 90/007,491 dated Jul. 3, 2008.
Notice of Hearing from Control No. 90/007,491 dated Aug. 22, 2008.
Hearing Attendance Confirmation from Control No. 90/007,491 dated Sep. 17, 2008.
Record of Oral Hearing from Control No. 90/007,491 dated Nov. 13, 2008.
Decision on Appeal from Control No. 90/007,491 dated Nov. 19, 2008.
Amendment for U.S. Appl. No. 09/698,481 dated Mar. 27, 2002.
Complaint for Patent Infringement Demand for Jury Trial, Case No. 1:06CV0517.
Request for Reexamination of U.S. Pat. No. 6/196,343, filed Apr. 28, 2006, 17 pgs.
Affidavit, executed Apr. 3, 2006 by Mark Sullivan, Invacare Corporation Vice President of Rehab submitted in reexamination Control No. 90/007,491, 5 pgs.
Affidavit, executed Apr. 3, 2006 by Gerold Goertzen Invacare Corporation Director of Research & Development submitted in reexamination Control No. 90/007,491, 7 pgs.
Office action from U.S. Appl. No. 08/228,584 dated Apr. 14, 1995.
Response from U.S. Appl. No. 08/228,584 dated Jul. 6, 1995.
Office action from U.S. Appl. No. 08/228,584 dated Sep. 28, 1995.
Interview Summary from U.S. Appl. No. 08/228,584 dated Nov. 30, 1995.
Response from U.S. Appl. No. 08/228,584 dated Dec. 28, 1995.
Office action from U.S. Appl. No. 08/228,584 dated Mar. 29, 1996.
Response from U.S. Appl. No. 08/228,584 dated Jun. 3, 1996.
Notice of allowance from U.S. Appl. No. 08/228,584 dated Jun. 24, 1996.
Office action from U.S. Appl. No. 08/694,484 dated Dec. 2, 1996.
Response from U.S. Appl. No. 08/694,484 dated Apr. 2, 1997.
Office action from U.S. Appl. No. 08/694,484 dated Jul. 7, 1997.
Office action from U.S. Appl. No. 08/694,484 dated Dec. 3, 1997.
Office action from U.S. Appl. No. 08/694,484 dated Feb. 10, 1998.
Response from U.S. Appl. No. 08/694,484 dated May 4, 1998.
Notice of Allowance from U.S. Appl. No. 08/694,484 dated Jul. 31, 1998.
Office action from U.S. Appl. No. 09/191,332 dated Jan. 19, 2000.
Response from U.S. Appl. No. 09/191,332 dated Apr. 18, 2000.
Notice of Allowance from U.S. Appl. No. 09/191,332 dated Jul. 3, 2000.
Notice of Allowance from U.S. Appl. No. 09/426,369 dated Oct. 20, 2000.
Office action from U.S. Appl. No. 09/607,468 dated Sep. 26, 2001.
Response from U.S. Appl. No. 09/607,468 dated Dec. 21, 2001.
Office action from U.S. Appl. No. 09/607,468 dated Apr. 18, 2002.
Response from U.S. Appl. No. 09/607,468 dated Jun. 21, 2002.
Notice of Allowance from U.S. Appl. No. 09/607,468 dated Jun. 28, 2002.
U.S. Patent Office action dated Nov. 27, 2001 from U.S. Appl. No. 09/698,481.
Response from U.S. Appl. No. 09/698,481 dated Mar. 27, 2002.
U.S. Patent Office action dated Jun. 27, 2002 from U.S. Appl. No. 09/698,481.
Response from U.S. Appl. No. 09/698,481 dated Oct. 29, 2002.
U.S. Patent Office Advisory action dated Nov. 13, 2002 from U.S. Appl. No. 09/698,481.
Supplemental Amendment after Final dated Nov. 27, 2002 from U.S. Appl. No. 09/698,481.
Notice of Allowance dated Dec. 12, 2002 from U.S. Appl. No. 09/698,481.
Office action from U.S. Appl. No. 09/712,547 dated May 23, 2001.
Response from U.S. Appl. No. 09/712,547 dated Aug. 23, 2001.
Office action from U.S. Appl. No. 09/712,547 dated Oct. 30, 2001.
Response from U.S. Appl. No. 09/712,547 dated Jan. 28, 2002.
Notice of Allowance from U.S. Appl. No. 09/712,547 dated Mar. 11, 2002.
Office action from U.S. Appl. No. 09/974,348 dated Feb. 27, 2003.
Response from U.S. Appl. No. 09/974,348 dated Jul. 28, 2003.
Office action from U.S. Appl. No. 09/974,348 dated Oct. 22, 2003.
Interview Record from U.S. Appl. No. 09/974,348 dated Oct. 28, 2003.
Response from U.S. Appl. No. 09/974,348 dated Jan. 26, 2004.
Advisory Action from U.S. Appl. No. 09/974,348 dated Feb. 27, 2004.
Response from U.S. Appl. No. 09/974,348 dated Apr. 16, 2004.
Notice of Allowance from U.S. Appl. No. 09/974,348 dated May 11, 2004.
Notice of Allowance from U.S. Appl. No. 09/974,348 dated May 20, 2005.
Office action from related U.S. Appl. No. 10/044,826, mailed Apr. 29, 2003.
Response from U.S. Appl. No. 10/044,826 dated Oct. 29, 2003.
Notice of Abandonment from U.S. Appl. No. 10/044,826 dated Nov. 18, 2003.
Response from U.S. Appl. No. 10/044,826 dated Jan. 20, 2004.
Response from U.S. Appl. No. 10/044,826 dated Aug. 16, 2004.
Office Action dated Sep. 8, 2006 from U.S. Appl. No. 11/145,477.
Notice of Allowability from U.S. Appl. No. 10/044,826 dated Jun. 14, 2005.
Notice of Allowance from U.S. Appl. No. 10/044,826 dated Apr. 3, 2006.
U.S. Patent Office action dated Aug. 8, 2003 from U.S. Appl. No. 10/390,133.
Response from U.S. Appl. No. 10/390,133 dated Feb. 11, 2004.
U.S. Patent Office action dated Jun. 16, 2004 from U.S. Appl. No. 10/390,133.
Response from U.S. Appl. No. 10/390,133 dated Dec. 20, 2004.
Supplemental Notice of Allowance dated Mar. 30, 2005 from U.S. Appl. No. 10/390,133.
Notice of Allowance dated Jan. 11, 2005 from U.S. Appl. No. 10/390,133.
U.S. Patent Office action dated Aug. 8, 2003 from U.S. Appl. No. 10/390,386.
Response from U.S. Appl. No. 10/390,386 dated Nov. 11, 2003.
U.S. Patent Office action dated Jan. 28, 2004 from U.S. Appl. No. 10/390,386.

(56) References Cited

OTHER PUBLICATIONS

Response from U.S. Appl. No. 10/390,386 dated May 28, 2004.
U.S. Patent Office action dated Oct. 12, 2004 from U.S. Appl. No. 10/390,386.
Response from U.S. Appl. No. 10/390,386 dated Mar. 16, 2005.
Notice of Allowance dated Apr. 7, 2005 from U.S. Appl. No. 10/390,386.
Notice of Allowance from U.S. Appl. No. 10/643,010 dated Sep. 30, 2004.
Office action from U.S. Appl. No. 10/695,045 dated Feb. 22, 2005.
Response from U.S. Appl. No. 10/695,045 dated Jul. 25, 2005.
Office action from U.S. Serial No. 10/695,045 dated Oct. 20, 2005.
Response from U.S. Appl. No. 10/695,045 dated Jan. 17, 2006.
Notice of Allowance from U.S. Appl. No. 10/695,045 dated Apr. 11, 2006.
Office action from U.S. Appl. No. 10/762,977 dated Jan. 18, 2005.
Response from U.S. Appl. No. 10/762,977 dated May 18, 2005.
Office action from U.S. Appl. No. 10/762,977 dated Aug. 11, 2005.
Response from U.S. Appl. No. 10/762,977 dated Oct. 3, 2005.
Notice of Allowance from U.S. Appl. No. 12/330,554 dated Nov. 15, 2011.
Notice of Allowance from U.S. Appl. No. 12/330,554 dated Feb. 14, 2012.
Office action from U.S. Appl. No. 12/522,837 dated Feb. 15, 2011.
Amendment from U.S. Appl. No. 12/522,837 dated Jun. 15, 2011.
Notice of Allowance from U.S. Appl. No. 12/522,837 dated Jul. 26, 2011.
Notice of Allowance from U.S. Appl. No. 12/522,837 dated Jun. 28, 2012.
Office action from U.S. Appl. No. 12/523,630 dated Dec. 21, 2011.
Response from U.S. Appl. No. 12/523,630 dated Mar. 15, 2012.
Notice of Allowance from U.S. Appl. No. 12/523,630 dated Jun. 11, 2012.
Restriction /Election Requirement for U.S. Appl. No. 12/524,476 dated Dec. 31, 2012.
Office action from U.S. Appl. No. 12/524,476 dated May 22, 2013.
Amendment in U.S. Appl. No. 12/524,476 dated Nov. 20, 2013.
Final Office Action in U.S. Appl. No. 12/524,476 dated Feb. 27, 2014.
Notice of Allowance from U.S. Appl. No. 12/524,476 dated Aug. 15, 2014.
Office action from U.S. Appl. No. 12/568,728 dated Jun. 10, 2010.
Response from U.S. Appl. No. 12/568,728 dated Nov. 5, 2010.
Office action from U.S. Appl. No. 12/568,728 dated Jan. 24, 2011.
Notice of Allowance from U.S. Appl. No. 12/568,728 dated Oct. 26, 2011.
Examiner-Initiated Interview Summary from U.S. Appl. No. 12/568,728 dated Dec. 8, 2011.
RCE with Remarks (Amendments to Specification) from U.S. Appl. No. 12/568,728 dated Jan. 9, 2012.
Notice of Allowance from U.S. Appl. No. 12/568,728 dated Jan. 24, 2012.
Office Action from U.S. Appl. No. 13/413,839 dated Sep. 26, 2013.
Response to Office Action from U.S. Appl. No. 13/413,839 dated Feb. 26, 2014.
Notice of Allowance from U.S. Appl. No. 13/413,839 dated May 1, 2014.
Restriction Requirement in U.S. Appl. No. 13/465,404 dated Jan. 3, 2013.
Response to Restriction Requirement in U.S. Appl. No. 13/465,404 dated Feb. 4, 2013.
Office Action in U.S. Appl. No. 13/465,404 dated Apr. 11, 2013.
Response to Office Action in U.S. Appl. No. 13/465,404 dated Jul. 11, 2013.
Notice of Allowance in U.S. Appl. No. 13/465,404 dated Sep. 27, 2013.
Office Action from U.S. Appl. No. 13/465,268 dated Jul. 19, 2012.
Response to Office Action from U.S. Appl. No. 13/465,268 dated Jan. 22, 2013.
Final Office Action in U.S. Appl. No. 13/465,268 dated Apr. 15, 2013.
Amendment with RCE, terminal disclaimer for U.S. Appl. No. 13,465,268 dated Oct. 15, 2013.
Non-Final Office Action in U.S. Appl. No. 13/465,268 dated Apr. 15, 2014.
Notice of Allowance for U.S. Appl. No. 13/465,268 dated Oct. 24, 2014.
First Office Action in U.S. Appl. No. 13/566,473 dated Dec. 6, 2012.
Response in U.S. Appl. No. 13/566,473 dated Apr. 8, 2013.
Office Action in U.S. Appl. No. 13/568,623 dated Feb. 1, 2013.
Response to Office Action in U.S. Appl. No. 13/568,623 dated Jun. 19, 2013.
Notice of Allowance in U.S. Appl. No. 13/568,623 dated Oct. 9, 2013.
Notice of Allowance in U.S. Appl. No. 13/568,623 dated Apr. 2, 2014.
Restriction Requirement in U.S. Appl. No. 12/900,548 dated Jun. 28, 2013.
Response to Restriction Requirement in U.S. Appl. No. 12/900,548 dated Jul. 29, 2013.
Office Action in U.S. Appl. No. 12/900,548 dated Sep. 9, 2013.
Response to Office Action in U.S. Appl. No. 12/900,548 dated Jan. 28, 2014.
Office Action in U.S. Appl. No. 12/900,548 dated Jun. 2, 2014.
RCE and Amendment Filed in U.S. Appl. No. 12/900,548 dated Oct. 1, 2014.
Notice of Allowance in U.S. Appl. No. 12/900,548 dated Dec. 18, 2014.
Restriction Requirement from U.S. Appl. No. 13/768,878 dated Jun. 4, 2014.
Response to Restriction Requirement for U.S. Appl. No. 13/768,878 dated Sep. 4, 2014.
Office action from U.S. Appl. No. 10/762,977 dated Oct. 25, 2005.
Notice of Allowance from U.S. Appl. No. 10/762,977 dated Feb. 23, 2006.
Notice of Allowance from U.S. Appl. No. 11/077,483 dated Aug. 9, 2007.
Office Action mailed Mar. 28, 2006 from U.S. Appl. No. 11/145,477.
Response from U.S. Appl. No. 11/145,477 dated Dec. 12, 2006.
Notice of Allowance from U.S. Appl. No. 11/145,477 dated Jan. 8, 2007.
U.S. Patent Office Action dated Jul. 25, 2006 from U.S. Appl. No. 11/209,001.
Office Action dated Nov. 8, 2006 from U.S. Appl. No. 11/209,001.
Notice of Abandonment from U.S. Appl. No. 11/209,001 dated Jul. 10, 2007.
Office Action from U.S. Appl. No. 11/429,687 dated Apr. 9, 2008.
Response from U.S. Appl. No. 11/429,687 dated Jun. 17, 2008.
Notice of Allowance from U.S. Appl. No. 11/429,687 dated Sep. 8, 2008.
Office Action from U.S. Appl. No. 11/472,509 dated May 4, 2007.
Interview Summary from U.S. Appl. No. 11/472,509 dated Aug. 3, 2007.
Response from U.S. Appl. No. 11/472,509 dated Aug. 3, 2007.
Office Action from U.S. Appl. No. 11/472,509 dated Nov. 30, 2007.
Response from U.S. Appl. No. 11/472,509 dated Apr. 30, 2008.
Response from U.S. Appl. No. 11/472,509 dated Jul. 22, 2008.
Office Action from U.S. Appl. No. 11/472,509 dated May 15, 2009.
Response from U.S. Appl. No. 11/472,509 dated Nov. 15, 2009.
Office action from U.S. Appl. No. 11/472,509 dated Sep. 2, 2010.
Response from U.S. Appl. No. 11/472,509 dated Jan. 3, 2011.
Notice of Appeal and Pre-Appeal Brief Request and Statement from U.S. Appl. No. 11/472,509 filed Mar. 2, 2011.
Interview Summary from U.S. Appl. No. 11/472,509 filed Mar. 2, 2011.
Non-Final Rejection from U.S. Appl. No. 11/472,509 dated Mar. 3, 2011.
Pre-Brief Appeal Conference Decision from U.S. Appl. No. 11/472,509 dated Mar. 23, 2011.
Non-Final Rejection from U.S. Appl. No. 11/472,509 dated Apr. 7, 2011.

(56) References Cited

OTHER PUBLICATIONS

Response from U.S. Appl. No. 11/472,509 dated Aug. 8, 2011.
Notice of Allowance from U.S. Appl. No. 11/472,509 dated Nov. 14, 2011.
Supplemental amendment identifying cross-references to related applications from U.S. Appl. No. 11/472,509 dated Aug. 7, 2012.
Notice of Allowance from U.S. Appl. No. 11/472,509 dated Oct. 19, 2012.
Office action dated Mar. 21, 2007 from U.S. Appl. No. 11/474,834.
Response from U.S. Appl. No. 11/474,834 dated Jun. 28, 2007.
Office action from U.S. Appl. No. 11/474,834 dated Sep. 20, 2007.
Response from U.S. Appl. No. 11/474,834 dated Nov. 20, 2007.
Notice of Allowance from U.S. Appl. No. 11/474,834 dated Jan. 17, 2008.
Office action dated Nov. 8, 2006 from U.S. Appl. No. 11/490,899.
Office action dated Jan. 9, 2007 from U.S. Appl. No. 11/490,899.
Response from U.S. Appl. No. 11/490,899 dated Mar. 20, 2007.
Notice of Allowance dated Jun. 6, 2007 from U.S. Appl. No. 11/490,899.
Notice of Allowance from U.S. Appl. No. 11/490,899 dated Feb. 10, 2009.
Notice of Allowance from U.S. Appl. No. 11/490,899 dated May 26, 2009.
Office action from U.S. Appl. No. 12/118,099 dated Oct. 28, 2010.
Response to Office Action from U.S. Appl. No. 12/118,099 dated Apr. 25, 2011.
Notice of Allowance from U.S. Appl. No. 12/118,099 dated Jul. 28, 2011.
Notice of Allowance from U.S. Appl. No. 12/118,099 dated Jul. 3, 2013.
Office Action from U.S. Appl. No. 12/330,554 dated Apr. 11, 2011.
Response to Office Action from U.S. Appl. No. 12/330,554 dated Jul. 11, 2011.
Notice of Allowance from U.S. Appl. No. 12/330,554 dated Sep. 23, 2011.
Office Action from U.S. Appl. No. 13/768,878 mailed Dec. 3, 2014.
Response Office Action from U.S. Appl. No. 13/768,878 mailed Jan. 21, 2015.
Notice of Allowance from U.S. Appl. No. 14/162,955 mailed May 26, 2015.
Restriction Requirement from U.S. Appl. No. 14/486,766 dated Jun. 8, 2015.
Response to Restriction Requirement from U.S. Appl. No. 14/486,766 dated Aug. 10, 2015.
Office Action from U.S. Appl. No. 14/486,766 dated Sep. 16, 2015.
Response to Office Action from U.S. Appl. No. 14/486,766 dated Dec. 8, 2015.
Office Action from U.S. Appl. No. 14/566,899 dated Sep. 17, 2015.
Response to Office Action from U.S. Appl. No. 14/566,899 dated Dec. 10, 2015.
Office Action from U.S. Appl. No. 14/585,393 dated Sep. 3, 2015.
Office Action from U.S. Appl. No. 14/690,678 dated Nov. 16, 2015.
Notice of Allowance for U.S. Appl. No. 13/768,878 dated Dec. 11, 2015.
Notice of Allowance from U.S. Appl. No. 14/566,899 dated Jan. 21, 2016.
Office Action from U.S. Appl. No. 14/690,678 dated Jul. 15, 2016.
Response to Office Action from U.S. Appl. No. 14/875,110 dated Sep. 20, 2016.

\* cited by examiner

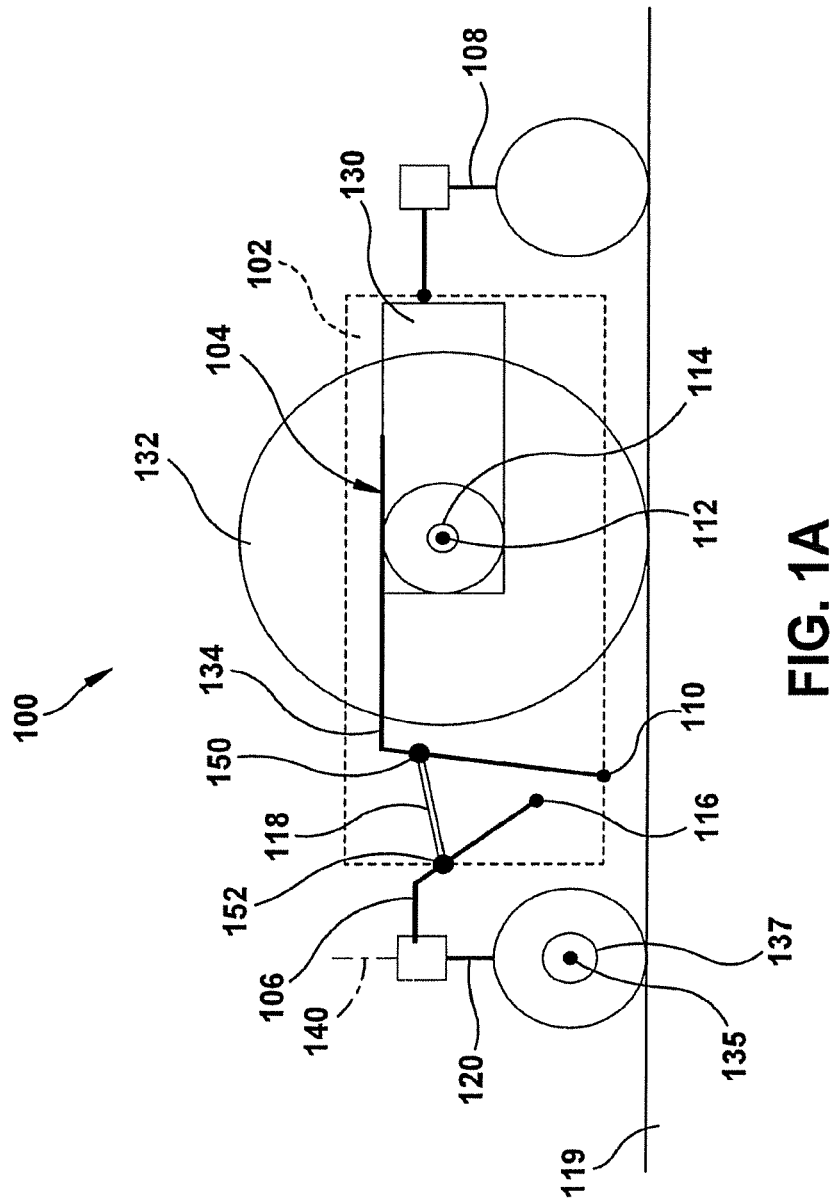

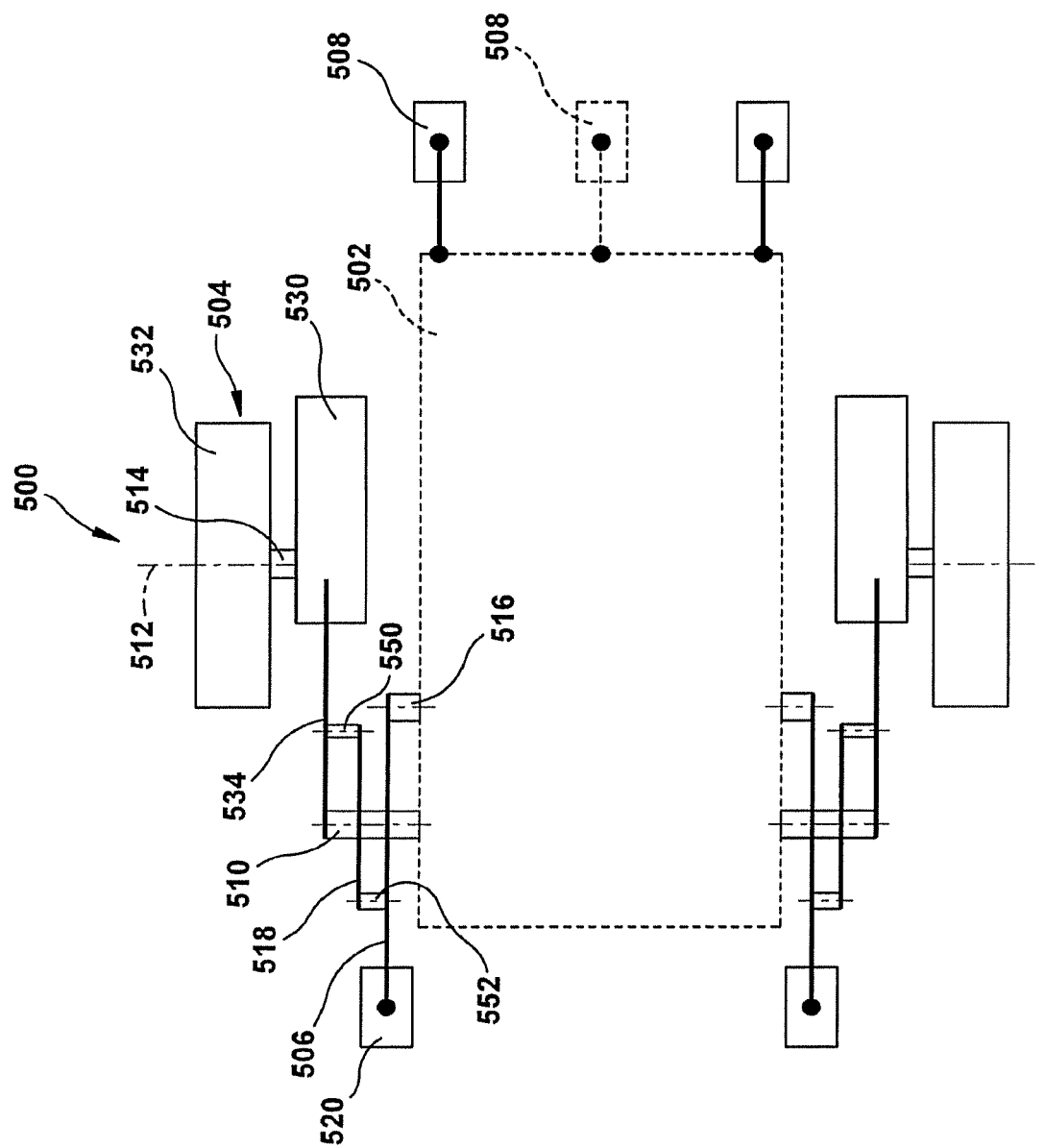

WHEELCHAIR SUSPENSION

RELATED APPLICATIONS

This application is a continuation of U.S. application Ser. No. 13/568,623, filed Aug. 7, 2012, which is a continuation of U.S. application Ser. No. 12/523,630, with an international application date of Feb. 4, 2008, now U.S. Pat. No. 8,272,461, which is a 371 of PCT/US08/52878 filed Feb. 4, 2008, which applications claim the benefit of U.S. provisional patent application Ser. No. 60/900,137 for WHEELCHAIR SUSPENSION filed Feb. 8, 2007, the entire disclosures of which are fully incorporated herein by reference.

BACKGROUND

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs that are commonly present at sidewalks, driveways, and other paved surface interfaces. This degree of independence can also be limited if the vehicle is required to ascend inclines or descend declines.

Most wheelchairs have front and rear casters to stabilize the chair from tipping forward or backward and to ensure that the drive wheels are always in contact with the ground. The caster wheels are typically much smaller than the driving wheels and located both forward and rearward of the drive wheels. Though this configuration provides the wheelchair with greater stability, it can hamper the wheelchair's ability to climb over obstacles such as, for example, curbs or the like, because the size of the front casters limits the height of the obstacle that can be traversed.

SUMMARY

According to one embodiment, a suspension for a vehicle is provided. The suspension includes, for example, a frame, at least one drive assembly and at least one caster pivot arm. The at least one drive assembly and the at least one caster pivot arm are pivotally connected to the frame at a common pivot axis such that the drive assembly and the front caster pivot arm are pivotable relative to one another.

BRIEF DESCRIPTION OF THE DRAWINGS

In the accompanying drawings which are incorporated in and constitute a part of the specification, embodiments of the invention are illustrated, which together with a general description of the invention given above and the detailed description given below, serve to example the principles of this invention.

FIG. 1A is a side view of a second configuration of the wheelchair suspension of FIG. 1;

FIG. 6 is a top view of the embodiment of the wheelchair suspension shown in FIG. 5;

DETAILED DESCRIPTION

The present patent application specification and drawings provide multiple embodiments of a wheelchair and suspension that enhances the ability of the vehicle to traverse obstacles and or improve the ride quality of the wheelchair. Generally, the wheelchair suspension includes a frame, a drive assembly and a front caster pivot arm. The drive assembly and the front caster pivot arm are coupled to enhance the vehicle's ability to traverse obstacles. In one embodiment, the drive assembly is pivotally mounted to the frame at a location that is below an axis of rotation of a drive axle of the drive assembly. In another embodiment, the pivot arm of the drive assembly and the front caster pivot arm are coupled to the frame in a crossed configuration. In another embodiment, the drive assembly and the front caster pivot arm are coupled by a variable length motion transfer member such as, for example, a shock absorber, a spring, or a shock absorber with a spring return or other resilient member or device. In another embodiment, the drive assembly and the front caster pivot arm are coupled by a damped and sprung suspension member.

Figure 1:
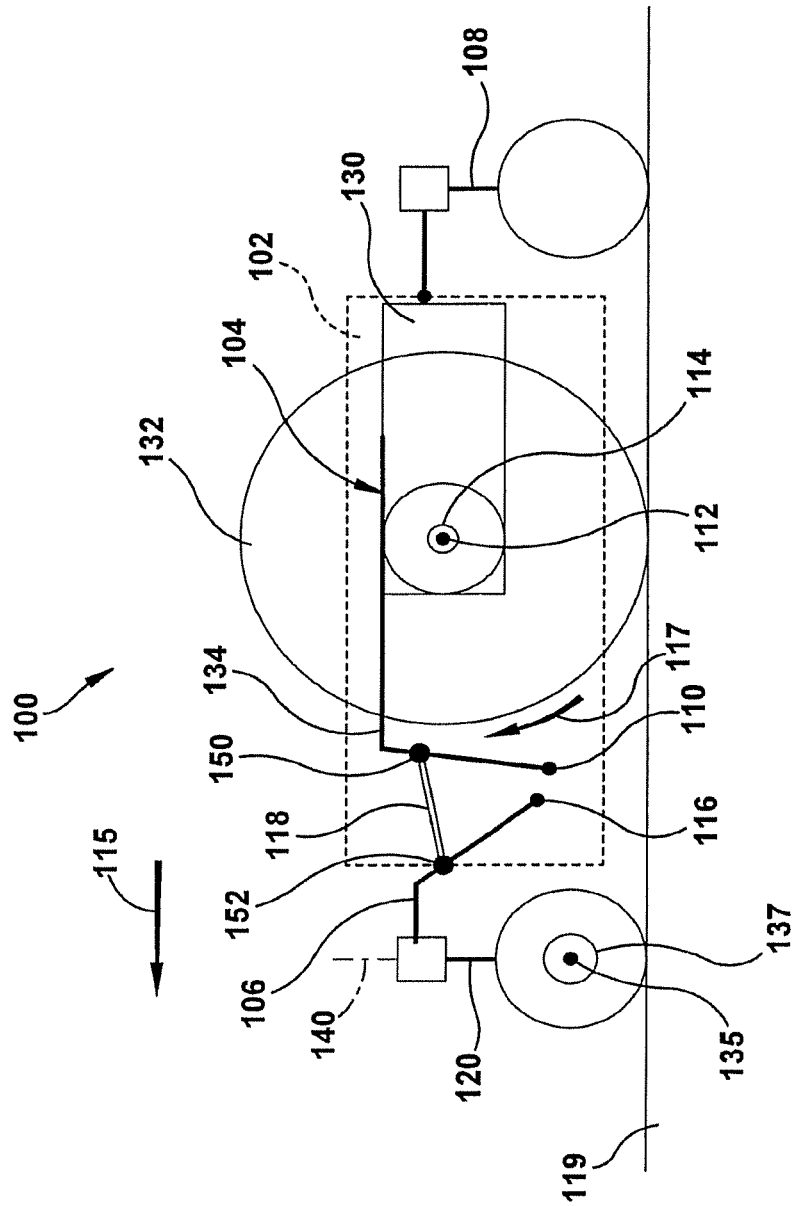
FIG. 1 is a side view of an embodiment of a wheelchair suspension.
Figure 2:
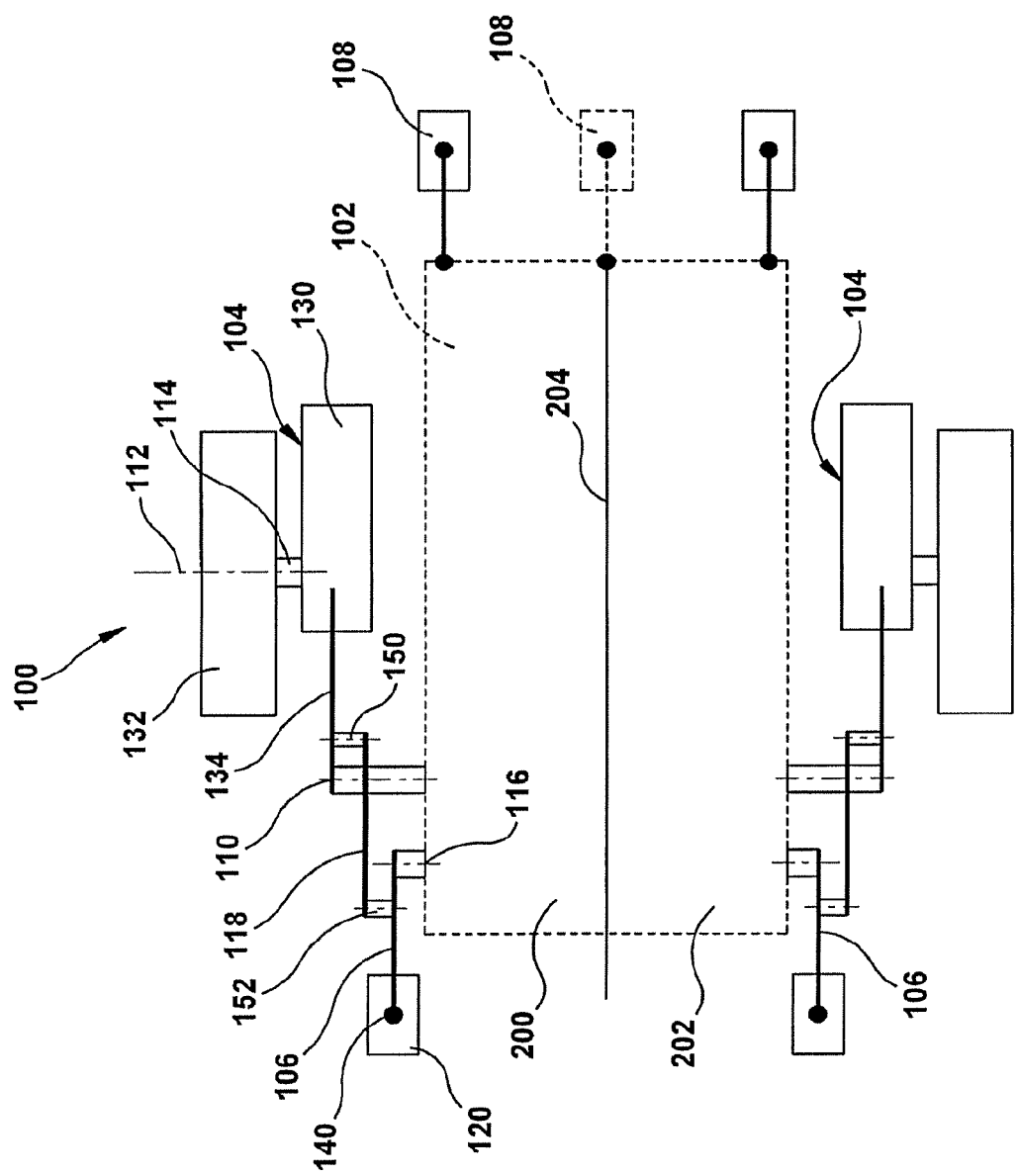
FIG. 2 is a top view of the wheelchair suspension shown in FIG. 1.

FIGS. 1 and 2 illustrate a first embodiment of a wheelchair suspension 100. The wheelchair suspension 100 includes a frame 102, a drive assembly 104, a front caster pivot arm 106, and a rear caster 108. In this application, the term "frame" refers to any component or combination of components that are configured for mounting of a drive assembly and a caster pivot arm. The drive assembly 104 is pivotally mounted to the frame 102 at a drive assembly pivot axis 110. The drive assembly pivot axis 110 can be positioned at a wide variety of different locations on the frame 102. For example, the pivot axis 110 can be positioned at any position on the frame, including but not limited to, any of the positions shown or described with respect to this embodiment or the following embodiments. In the embodiment illustrated by FIGS. 1 and 2, the drive assembly pivot axis 110 of the drive assembly 104 is below an axis of rotation 112 of a drive axle 114 of the drive assembly 104.

In the embodiment illustrated by FIGS. 1 and 2, each drive assembly 104 includes a motor drive 130, a drive wheel 132, and a pivot arm 134. The motor drive 130 may comprise a motor/gear box combination, a brushless, gearless motor, or any other known arrangement for driving the drive wheel 132. The motor drive 130 drives the drive wheel 132 about the axis of rotation 112. The pivot arm 134 may be a substantially rigid member that is connected to the motor drive 130. In one embodiment, the pivot arm 134 is flexible to provide inherent shock absorbing properties in the pivot arm. The pivot arm 134 may be made from a wide variety of materials, including, but not limited to, metals and plastics. The pivot arm 134 is pivotally coupled to the frame at the drive assembly pivot axis 110. In the embodiment illustrated by FIGS. 1 and 2, the pivot arm 134 extends forward and downward from the motor drive to the drive assembly pivot axis 110. In this application, the terms "above" and "below" refer to the relative positions of the components when all of the wheels of the suspension are on a flat, level surface. In FIG. 1, the pivot axis 110 of the drive assembly pivot arm 134 is below the drive wheel axis of rotation 112 and is above an axis 135 of an axle 137 that the front caster wheel rotates around. FIG. 1A illustrates another configuration where the pivot axis 110 of the drive assembly pivot arm 134 is below the drive wheel axis of rotation 112 and the axis 135 of the axle 137 that the front caster wheel rotates around.

Torque is applied by the drive assembly 104 to the drive wheel 132 to cause the wheelchair to accelerate or decelerate. If the pivot arm 134 were not pivotally connected to the frame 102, applying torque with the drive assembly 104 to the drive wheel 132 to accelerate the wheelchair in the direction indicated by arrow 115 would cause the pivot arm 134 to rotate upward, around the drive axis as indicated by arrow 117. The torque applied by the drive wheel(s) of the vehicle to accelerate the vehicle lifts the front wheel(s) of the vehicle off of the ground, if the torque is great enough.=In the suspension 100 illustrated by FIGS. 1 and 2, the drive assembly 104 is pivotally connected to the frame 102 at the pivot axis. As a result, the torque applied by the drive assembly 104 to accelerate the wheelchair urges the drive assembly 104 to rotate with respect to the frame 102 about the pivot axis 110.

The front caster pivot arm 106 is pivotally mounted to the frame 102 at a pivot arm pivot axis 116. The pivot arm pivot axis 116 can be positioned at a wide variety of different locations on the frame 102. For example, the pivot arm pivot axis 116 can be positioned at any position on the frame, including but not limited to, any of the positions shown or described with respect to this embodiment or the following embodiments.

The front caster pivot arm 106 is coupled to the drive assembly 104. The front caster pivot arm 106 can be coupled to the drive assembly in a wide variety of different ways. For example, the front caster pivot arm 106 can be coupled to the drive assembly 104 in any manner that transfers motion of the drive assembly to the front caster pivot arm, including but not limited to, a fixed length link, a variable length link, a flexible link, a chain, a cord, a belt, a wire, a gear train, or any other known structure for transferring motion from one structure to another structure. In the embodiment illustrated by FIG. 1, a link 118 is pivotally connected to the drive assembly 104 and the front caster pivot arm 106. The link 118 transfers motion of the drive assembly 104 to the front caster pivot arm 106. That is, the relative movement of the drive assembly 104 with respect to the frame 102 causes relative movement of the front caster pivot arm 106 with respect to the frame.

A front caster 120 is coupled to the caster pivot arm 106. Torque applied by the drive assembly 104 urges the front caster pivot arm 106 and the front caster 120 upward with respect to a support surface 119. In one embodiment, the torque applied by the drive assembly 104 lifts the front caster 120 off the support surface 119. In another embodiment, the torque applied by the drive assembly 104 urges the front caster 120 upward, but does not lift the front caster 120 up off of the support surface. In this embodiment, when an obstacle is encountered, the front caster 120 engages the obstacle and the torque of the drive assembly urges the caster upward to assist the caster over the obstacle.

The rear caster 108 is coupled to the frame. Any number of rear casters may be included. For example, one caster 108 may be included (shown in phantom in FIG. 2) or two rear casters 108 may be included (shown in solid lines in FIG. 2). In the FIG. 1C embodiment, rear casters are omitted. The suspension illustrated by FIG. 1C may be included as part of a rear drive wheelchair. Rear casters may be omitted from any of the embodiments disclosed herein. The rear casters 108 may be coupled to the frame 102 in a wide variety of different ways. For example, the rear casters 108 may be rigidly fixed to the frame, the rear casters may be individually pivotally coupled to the frame, or the rear casters may be mounted to a transverse beam that is pivotally coupled to the frame.

In the embodiment illustrated by FIG. 2, one drive assembly 104 and one front caster pivot arm 106 are coupled to a first side 200 of the frame 102 and a second drive assembly 104 and a second front caster pivot arm are coupled to a second side 202 of the frame. The first side 200 includes any portion of the frame 102 that is above line 204 in FIG. 2. The second side 202 includes any portion of the frame 102 that is below line 204 in FIG. 2 Only one of the drive assembly and front caster pivot arm arrangements is described in detail, since the drive assembly and pivot arm arrangements may be mirror images of one another in the FIG. 2 embodiment. In another embodiment, two different types of drive assemblies and front caster pivot arm arrangements may be on the sides of the frame.

The front caster 120 is coupled to the front caster pivot arm 106, such that the front caster can rotate about an axis 140. In one embodiment, a biasing member, such as a spring (not shown) may optionally be coupled between the frame and the front caster pivot aim and/or the frame and the drive assembly to bias the front caster into engagement with the support surface 119. The front caster pivot arm 106 may be a substantially rigid member. In one embodiment, the front caster pivot arm 106 is flexible to provide inherent shock absorbing properties in the front caster pivot arm. The pivot arm 106 may be made from a wide variety of materials, including, but not limited to, metals and plastics. The front caster pivot arm 106 is pivotally mounted to the frame 102 at the pivot axis 116. The pivot axis 116 of the front caster pivot arm is forward of the drive assembly pivot axis 110 and may be below the axis of rotation 112 of the drive wheel in the embodiments illustrated by FIGS. 1 and 1A.

In the embodiment illustrated by FIGS. 1 and 2, the link 118 is connected to the drive assembly pivot arm 134 at a pivotal connection 150. The link 118 is connected to the front caster pivot arm 106 at a pivotal connection 152. The link 118 can take a wide variety of different forms. For example, the link may be rigid, flexible, or extendible in length. Any link 118 that transfers at least some portion of motion in at least one direction of the drive assembly 104 to the front caster pivot arm can be used.

Figure 1B:
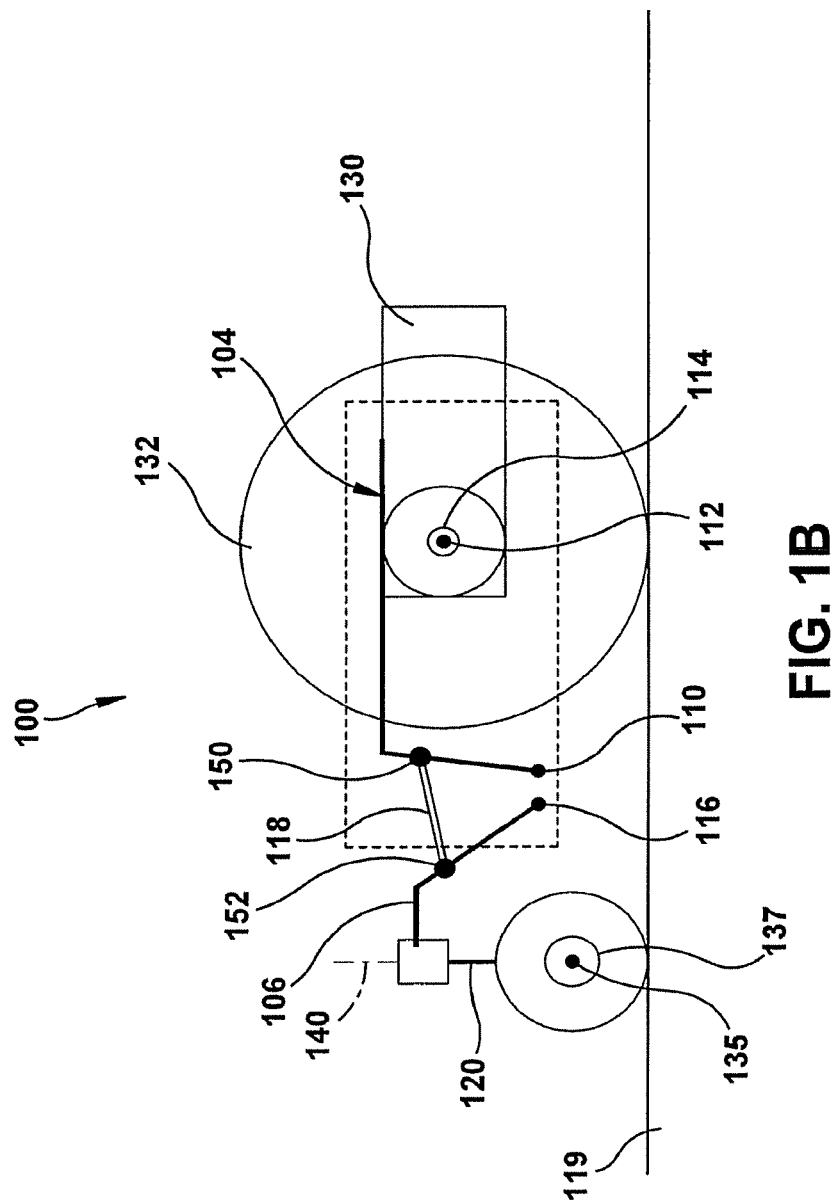
FIG. 1B is a side view of a rear drive configuration of the wheelchair suspension of FIG. 1.
Figure 1C:
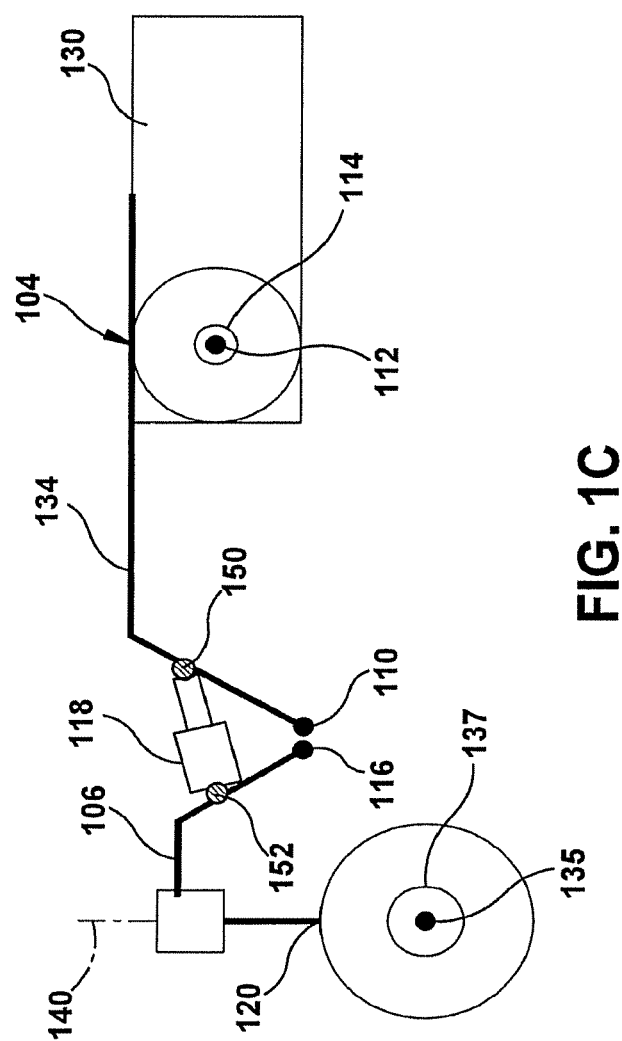
FIG. 1C illustrates components of a wheelchair suspension coupled by one embodiment of a shock absorber or resilient shock absorbing device.
Figure 1D:
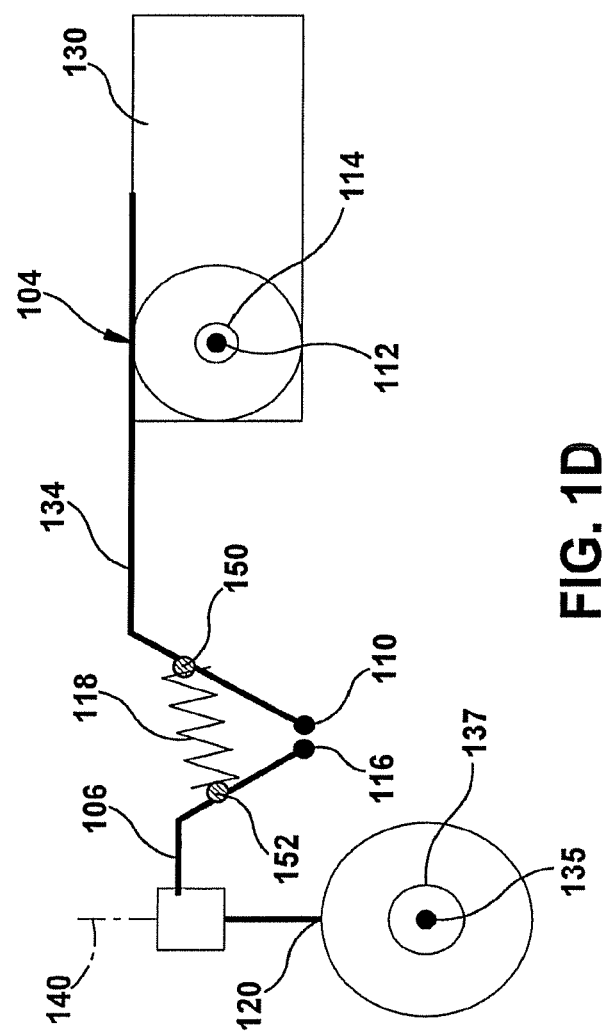
FIG. 1D illustrates components of a wheelchair suspension coupled by one embodiment of a spring or spring-type resilient device.
Figure 1E:
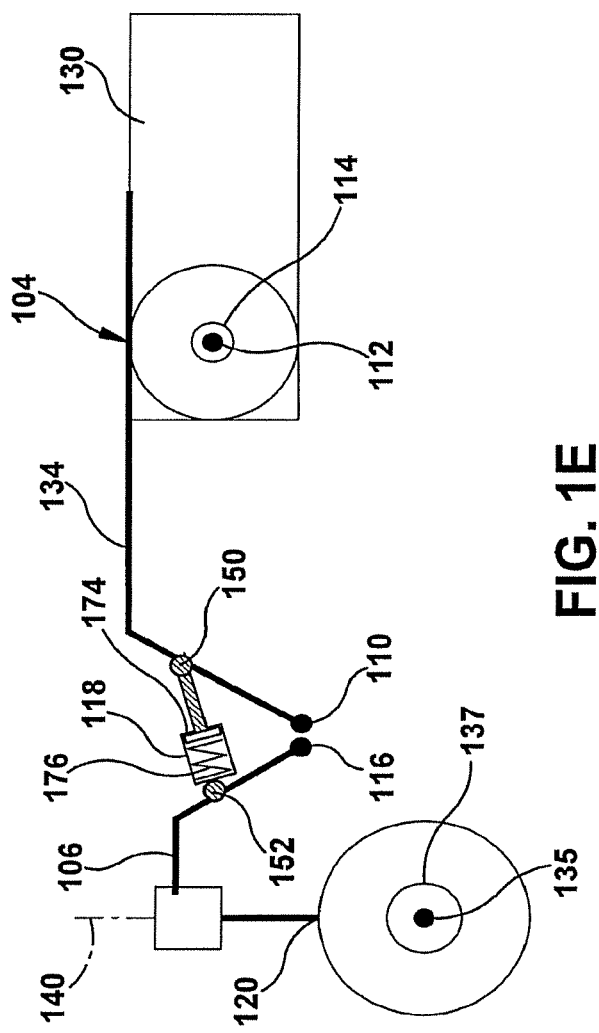
FIG. 1E illustrates components of a wheelchair suspension coupled by one embodiment of a shock absorber with a spring return.

FIGS. 1C, 1D, and 1E illustrate examples of variable length links. These and other variable length links can also be used in the embodiments illustrated by FIGS. 1, 1A and 1B and/or any of the embodiments described below. In FIG. 1C, the link 118 is a shock absorber. Any shock absorbing member or assembly can be used. The shock absorber damps relative motion between the front caster pivot arm 106 and the drive assembly pivot arm 134. An example of one acceptable shock absorber is an all terrain bicycle shock absorber available from the Rock Shox division of SRAM Corporation. In FIG. 1D, the link 118 is a spring. Any spring device or assembly can be used. The spring 172 may urge the front caster pivot arm 106 and the drive assembly pivot arm 134 apart, may urge the front caster pivot arm 106 and the drive assembly together or the spring may be a bidirectional spring. A bidirectional spring would bias the pivotal connections 150 and 152 to a predetermined spacing. In FIG. 1E, the link 118 comprises a shock absorber 174 with a spring return 176. The shock absorber 174 damps relative motion between the front caster pivot arm 106 and the drive assembly pivot arm 134. The spring return 176 may urge the front caster pivot arm 106 and the drive assembly pivot arm 134 apart, may urge the front caster pivot arm 106 and the drive assembly together or the spring may be a bidirectional spring An example of one acceptable shock absorber with a spring return is a Rock Shox MCR mountain bike shock.

Figure 3A:
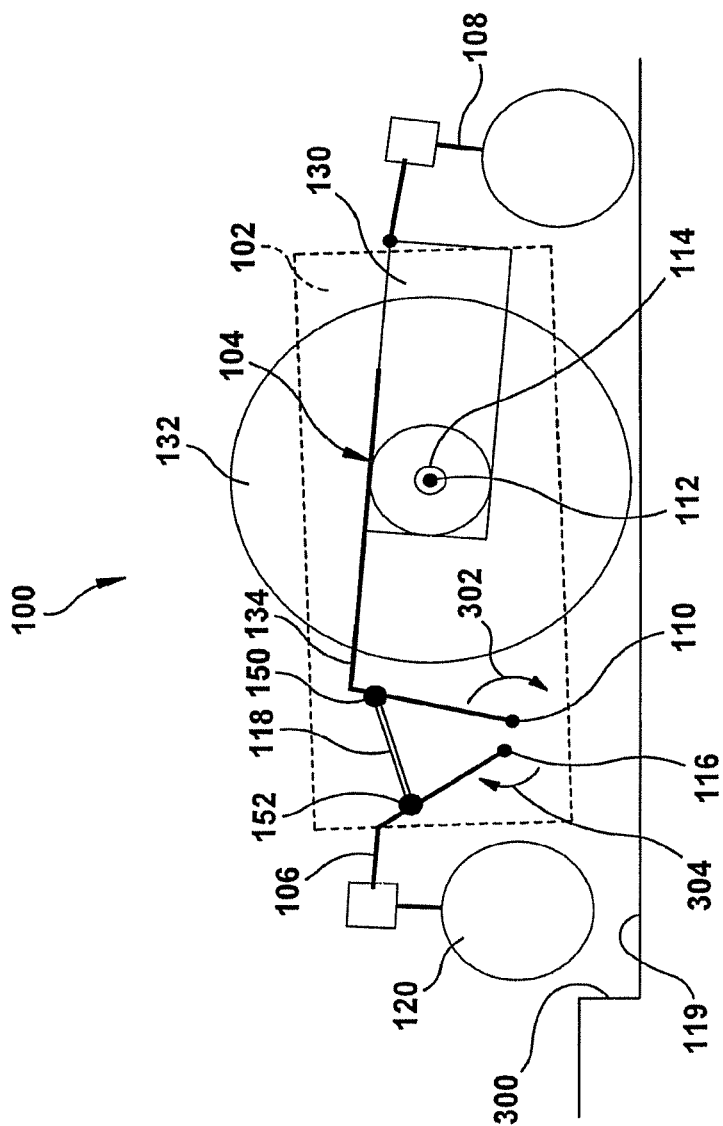
FIGS. 3A and 4A are side views of the wheelchair suspension of FIG. 1 traversing a raised obstacle.

FIG. 3A is an elevational view of the suspension 100 traversing over an obstacle 300 by ascending the obstacle. This operating condition may be accomplished by accelerating the drive wheels 132 in the forward direction as described above. In this scenario, the moment arm generated by drive wheel 132 around the pivot axis 110 in the direction indicated by arrow 302 may be greater than the sum of all moment arms around pivot axis 110 in the opposite direction. When this occurs, the drive assembly 104 to pivots as indicated by arrow 302 around pivot axis 110 with respect to the frame 102. The drive assembly pivot arm 134 pulls the link 118, which causes the front caster pivot arm 106 to pivot as indicated by arrow 304 around pivot axis 116. This causes front caster 120 to rise above obstacle 300 or urge the front caster upward to assist the front caster over the obstacle 300.

Figure 3B:
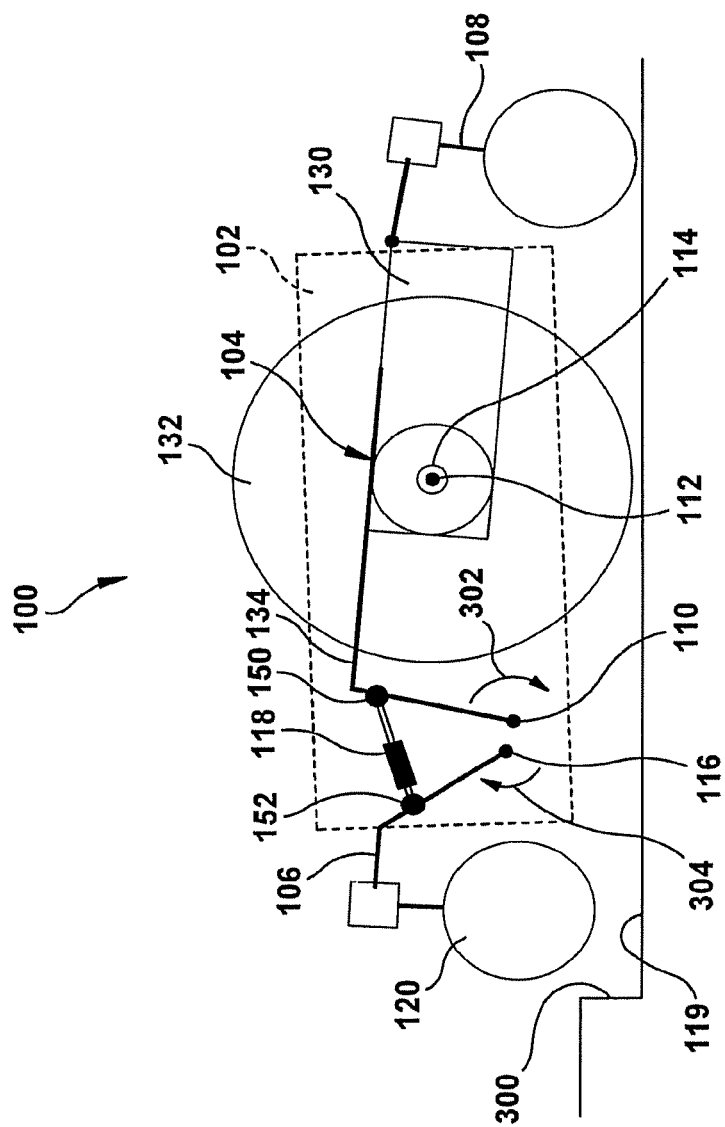
FIGS. 3B and 4B are side views of a wheelchair suspension having a variable length motion transfer member during traversal of a raised obstacle.
Figure 3C:
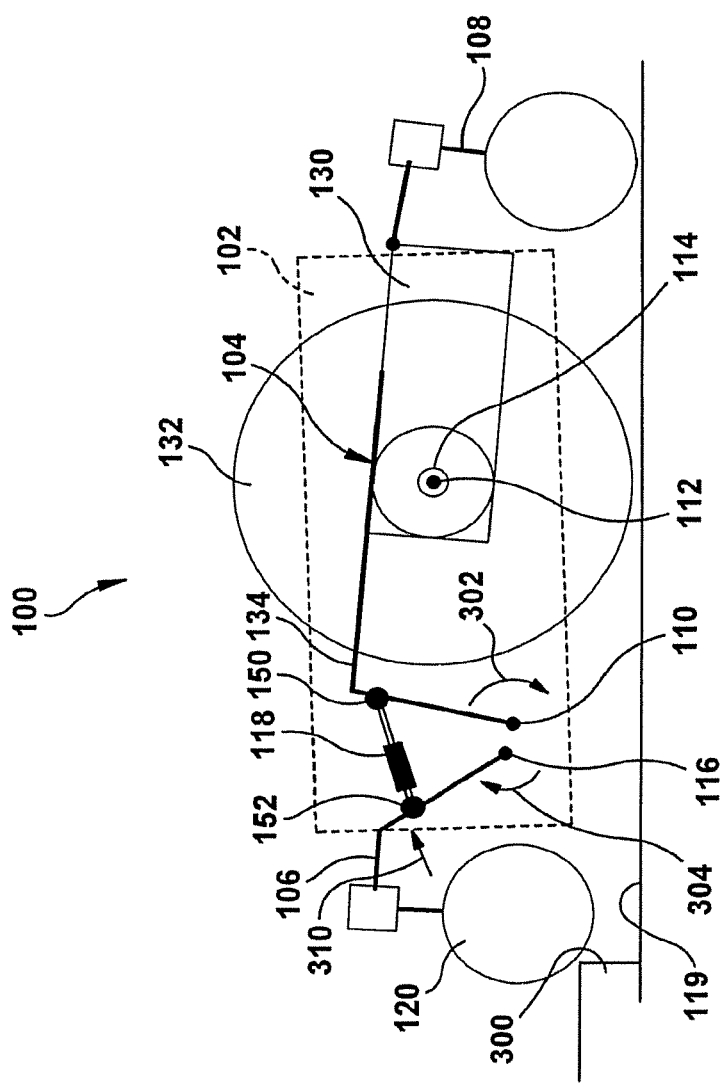
FIGS. 3C and 4C are side views of a wheelchair suspension having a variable length motion transfer member during traversal of a raised obstacle.

FIGS. 3B and 3C illustrate an embodiment of the suspension 100 traversing over the obstacle 300, where the link 118 is a variable length link, such as a spring, a shock absorber, or a shock absorber with a spring return. In this embodiment, the drive assembly pivot arm 134 pulls the link 118 to extend the link to its maximum length or a length where the front caster pivot arm 106 begins to pivot. Once extended, the link 118 pulls the front caster pivot arm 106 to pivot as indicated by arrow 304 around pivot axis 116. This causes front caster 120 to rise above obstacle 300 or urges the front caster upward to assist the front caster over the obstacle 300. Referring to FIG. 3C, when the front caster 120 engages the obstacle 300, the front caster pivot arm 106 pivots as indicated by arrow 310 and the link 118 compresses to absorb shock or energy that results from the impact between the front caster and the obstacle.

Figure 4A:
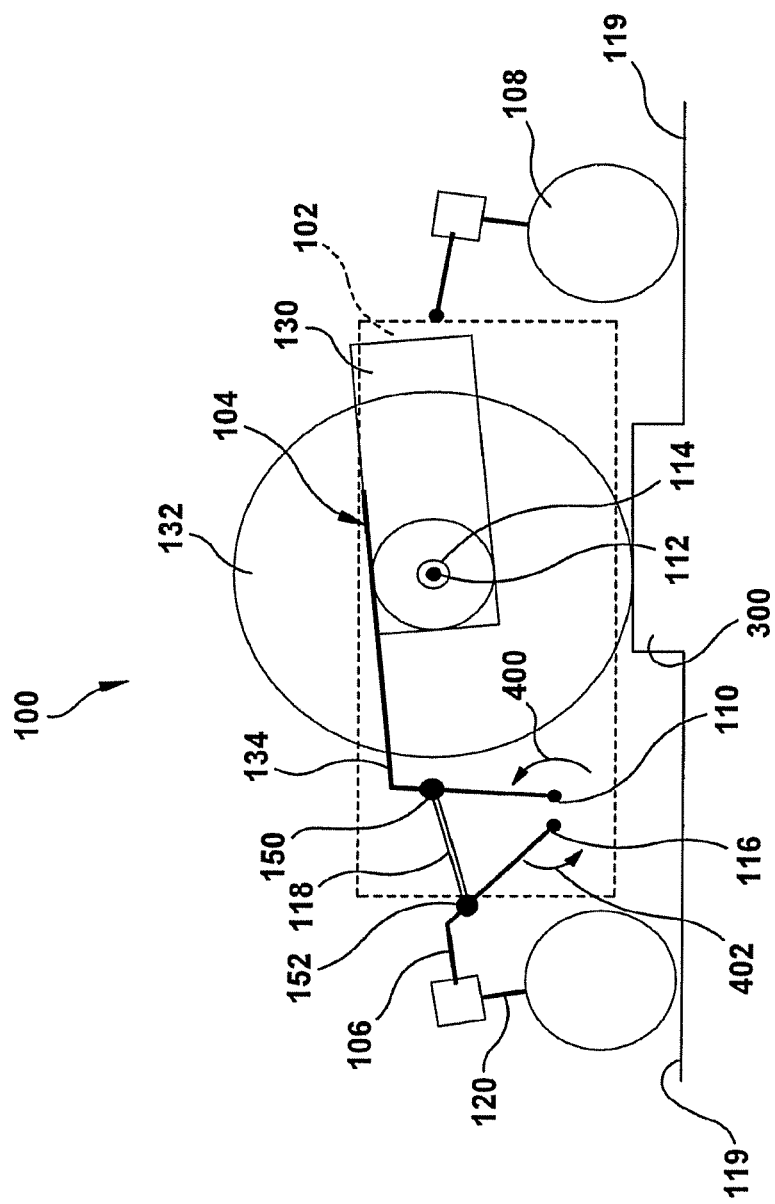

Illustrated in FIG. 4A is a side elevational view of the suspension 100 with the drive wheel 132 traversing the obstacle 300. When the drive wheel 132 comes into contact with the obstacle 300, drive assembly 104 pivots in the direction indicated by arrow 400 around pivot axis 110. The rotation of the drive assembly 104 is translated to the front caster pivot aim 106 to lower the caster 120 down onto the lower support surface elevation. When the link 118 is a rigid member, the drive assembly 104 and the front caster pivot arm 106 act in unison. One or more springs (not shown) may optionally be coupled to the drive assembly 104 and/or the front caster pivot arm 106 to urge the front caster pivot arm 106 to rotate about pivot axis 116 in the direction indicated by arrow 402.

Figure 4B:
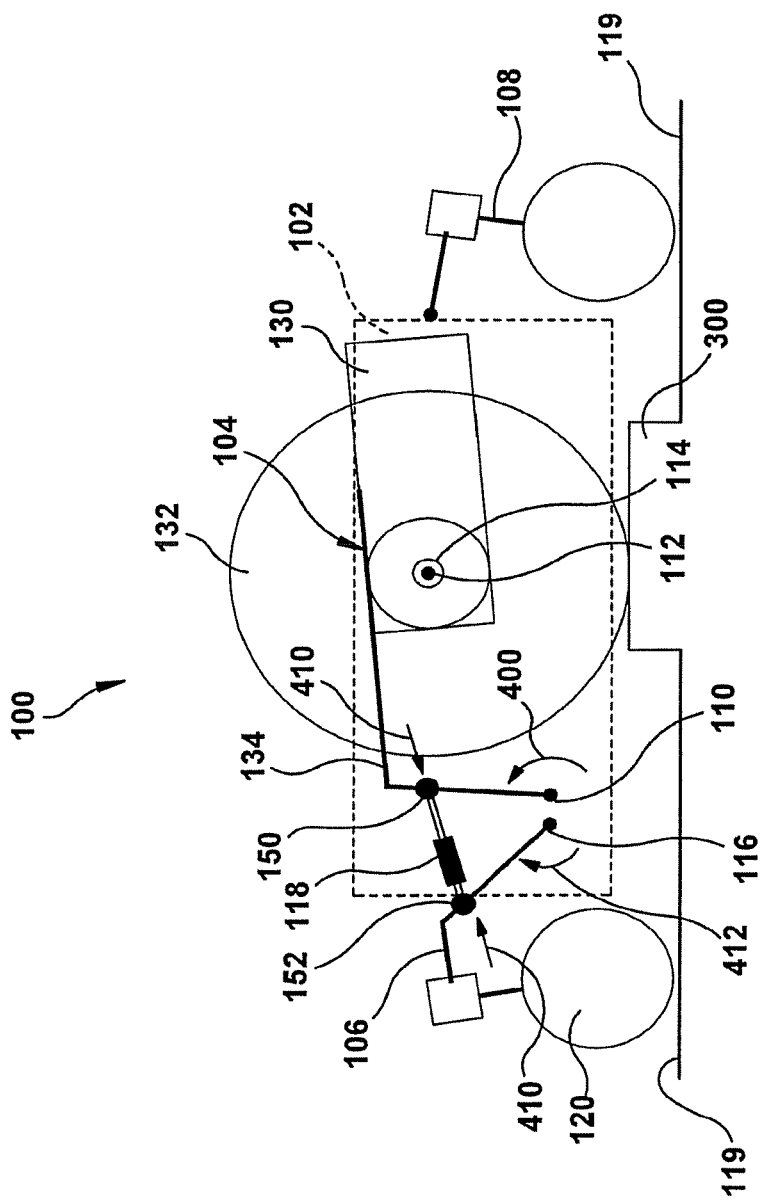

FIG. 4B illustrates an embodiment of the suspension 100 with the drive wheel 132 traversing over the obstacle 300, where the link 118 is a variable length link When the drive wheel 132 comes into contact with obstacle 300, the drive assembly 104 pivots in the direction indicated by arrow 400 around pivot axis 110 to soften the impact from obstacle 300 that is transferred to the frame 102. During such pivotal movement of the drive assembly 104, the link 118 compresses as indicated by arrows 410 to allow pivoting of the drive assembly 104 with respect to the front caster pivot arm. Compressing of the link 118 absorbs shock that results from the impact between the drive wheel 132 and the obstacle 300. When the front caster 120 comes into contact with the support surface 119, the pivot arm 106 pivots in the direction indicated by arrow 412 around pivot axis 116 to soften the impact support surface 119 that is transferred to the frame 102. During such pivotal movement of the pivot arm 106, the link 118 compresses to allow pivoting of the front caster pivot arm 106 with respect to the drive assembly. Compressing of the link 118 absorbs shock that results from the impact between the front caster 120 and the obstacle 300.

Figure 4C:
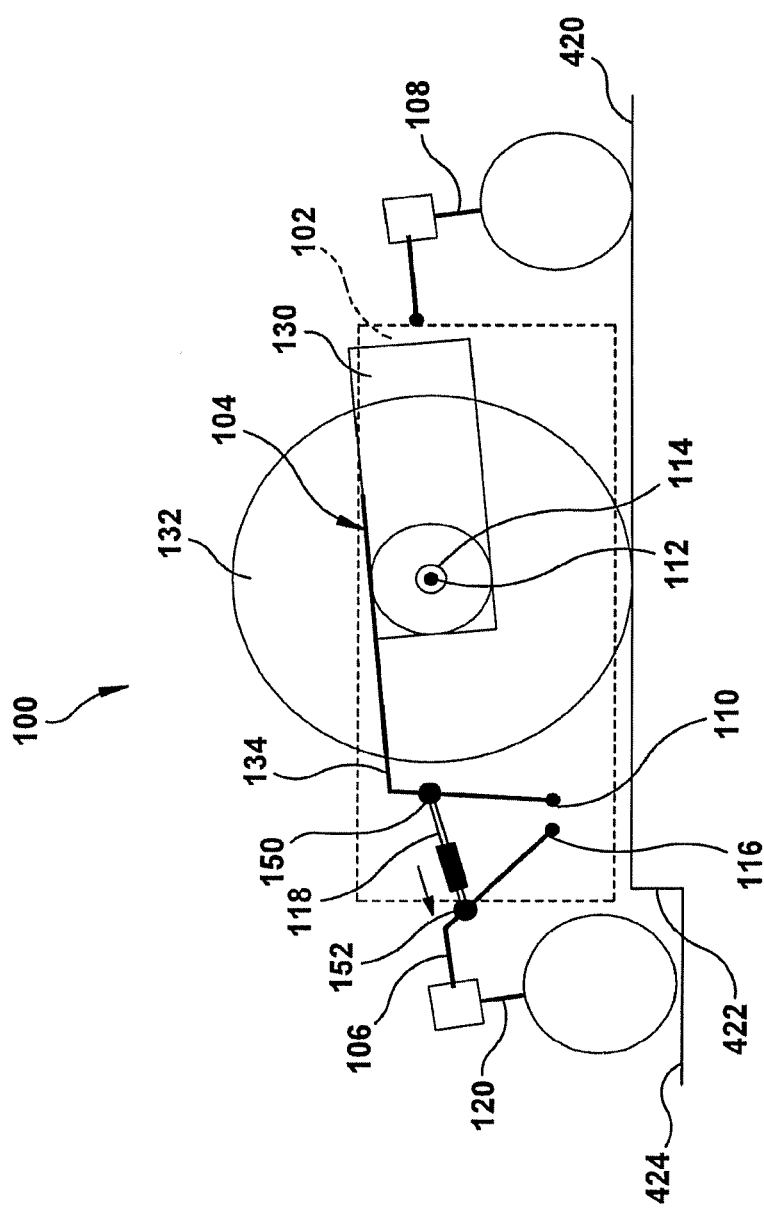

FIG. 4C illustrates an embodiment of the suspension 100 with the drive wheel 132 descending from an elevated surface 420 with a step 422 to a lower surface 424, where the link 118 is a variable length link. When the front caster 120 reaches the step 422, the front caster 422 and the front caster pivot arm 106 begin to move downward. The weight of the front caster pivot arm 106 and front caster 120, in combination with any weight supported by the front caster 120, pulls the link 118 to extend the link to its maximum length or until the front caster 120 engages the lower surface 424. By allowing the front caster 120 to drop down and engage the lower surface 424 before the drive wheel reaches the step, the front caster 120 and the link 118 can absorb shock that results from the drive wheel 132 moving from the upper surface 420 to the lower surface 424.

Figure 5:
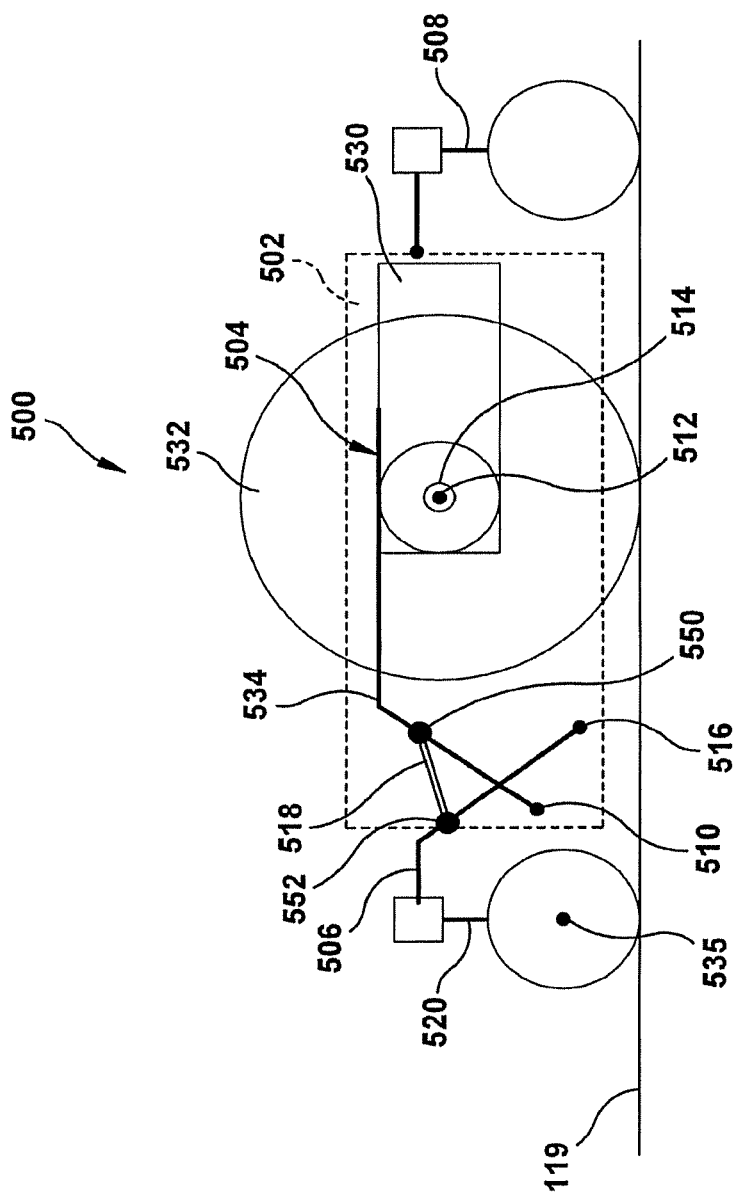
FIG. 5 is a side view of another embodiment of a wheelchair suspension.

FIGS. 5 and 6 illustrate another wheelchair suspension embodiment 500. The wheelchair suspension 500 includes a frame 502, a drive assembly 504, a front caster pivot arm 506, and a rear caster 508. The drive assembly 504 is pivotally mounted to the frame 502 at a drive assembly pivot axis 510. In the embodiment illustrated by FIGS. 5 and 6, the drive assembly pivot axis 510 of the drive assembly 504 is below an axis of rotation 512 of a drive axle 514 of the drive assembly 504 and is in front of a pivot axis 116 of the front caster pivot arm 506. As such, a drive assembly pivot arm 534 and the front caster pivot arm 506 are in a crossed configuration when viewed from the side as shown in FIG. 5. The front caster pivot arm 506 and the drive assembly pivot arm 534 may be laterally offset as shown in FIG. 6, or may be bent to accommodate the crossed configuration. By arranging the front caster pivot arm 506 and the drive assembly pivot arm 534 in the crossed configuration, the length of the front caster pivot arm 506 and/or the drive assembly pivot arm 534 can be increased as compared to suspension where the front caster pivot arm and the drive assembly pivot arm do not cross.

The front caster pivot arm 506 is coupled to the drive assembly 504. The front caster pivot arm 506 and the drive assembly 504 can be coupled in any manner that transfers at least a portion of the motion of the drive assembly in at least one direction to the front caster pivot arm. In the embodiment illustrated by FIG. 5, a link 518 is pivotally connected to the drive assembly 504 and the front caster pivot arm 506. The link 518 transfers motion of the drive assembly 504 to the front caster pivot arm. A front caster 520 is coupled to the caster pivot arm 506. Torque applied by the drive assembly 504 urges the front caster pivot arm 506 and the front caster 520 upward with respect to a support surface 119.

In the embodiment illustrated by FIGS. 5 and 6, each drive assembly 504 includes a motor drive 530, a drive wheel 532, and the pivot arm 534. The motor drive 530 drives the drive wheel 532 about the axis of rotation 512. In the embodiment illustrated by FIGS. 5 and 6, the pivot arm 534 extends forward and downward from the motor drive to the drive assembly pivot axis 510. In the configuration shown in FIG. 5, the drive assembly pivot axis 510 is below the drive wheel axis of rotation 512 and below an axis of rotation 535 of a wheel of the front caster 520.

In one embodiment, a biasing member, such as a spring (not shown) may optionally be coupled between the frame and the front caster pivot arm or the frame and the drive assembly to bias the front caster into engagement with the support surface 119. The front caster pivot arm 506 may be a substantially rigid member. In one embodiment, the front caster pivot arm 506 is flexible to provide inherent shock absorbing properties in the front caster pivot arm. The pivot arm 506 may be made from a wide variety of materials, including, but not limited to, metals and plastics. The front caster pivot arm 506 is pivotally mounted to the frame 502 at the pivot axis 516. The pivot axis 516 of the front caster pivot arm is rearward of the drive assembly pivot axis 510 and below the axis of rotation 512 of the drive wheel and below the axis of rotation 535 of the wheel of the front caster 520 in the embodiment illustrated by FIGS. 5 and 6.

In the embodiment illustrated by FIGS. 5 and 6, the link 518 is connected to the drive assembly pivot arm 534 at a pivotal connection 550. The link 518 is connected to the front caster pivot arm 506 at a pivotal connection 552. The link 518 can take a wide variety of different forms. For example, the link may be rigid, flexible, or extendible in length. Any link 518 that transfers at least some portion of motion in at least one direction of the drive assembly 504 to the front caster pivot arm can be used.

Figure 7A:
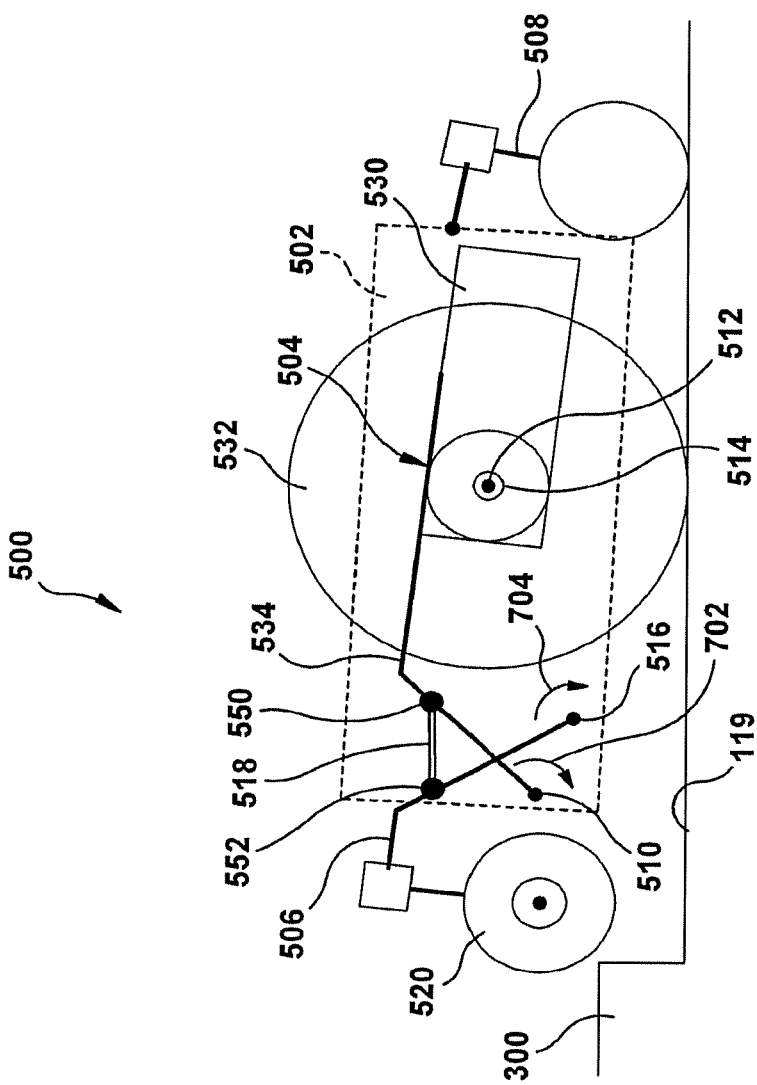
FIG. 7A is a side view of the wheelchair suspension of FIG. 5 traversing a raised obstacle.

FIG. 7A is an elevational view of the suspension 500 traversing over an obstacle 300 by ascending the obstacle. This operating condition may be accomplished by accelerating the drive wheels 532 in the forward direction. In this scenario, the moment arm generated by drive wheel 532 may be greater than opposite moment arms around pivot axis 510. When this occurs, the drive assembly 504 pivots as indicated by arrow 702 around pivot axis 510. The drive assembly pivot arm 534 pulls the link 518, which causes the front caster pivot arm 506 to pivot as indicated by arrow 704 around pivot axis 516. This causes front caster 520 to rise above obstacle 300 or urges the front caster upward to assist the front caster over the obstacle 300.

Figure 7B:
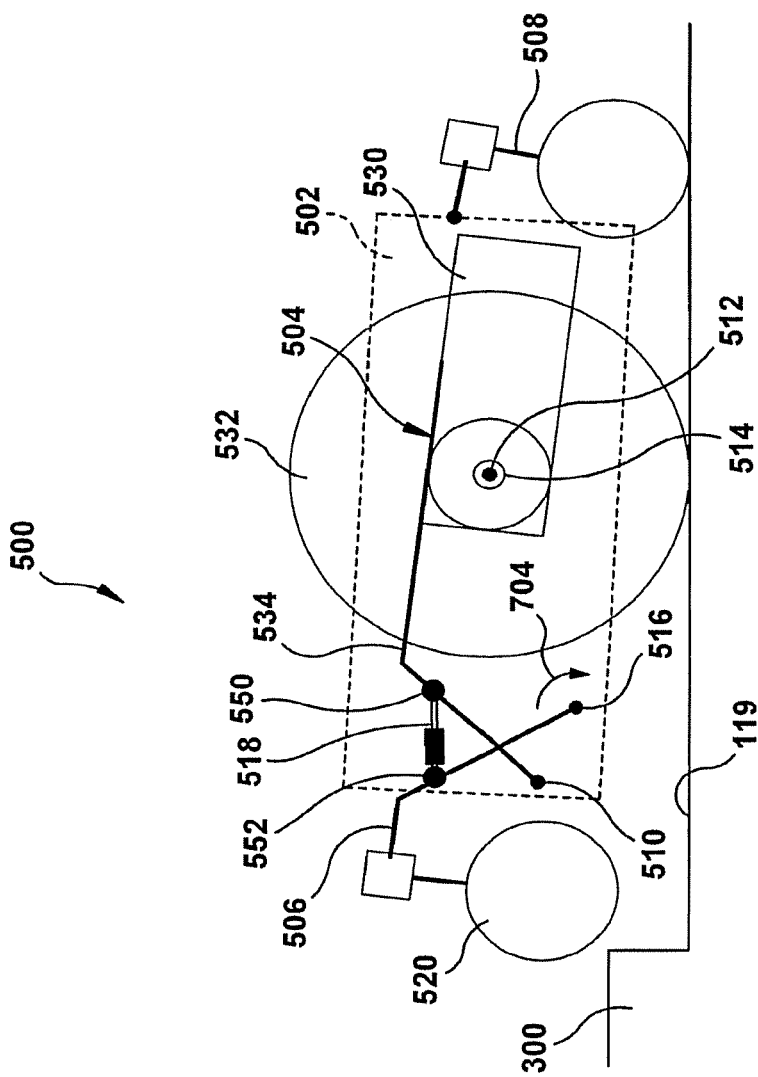
FIG. 7B is a side view of a wheelchair suspension with a variable length motion transfer member traversing a raised obstacle.
Figure 7C:
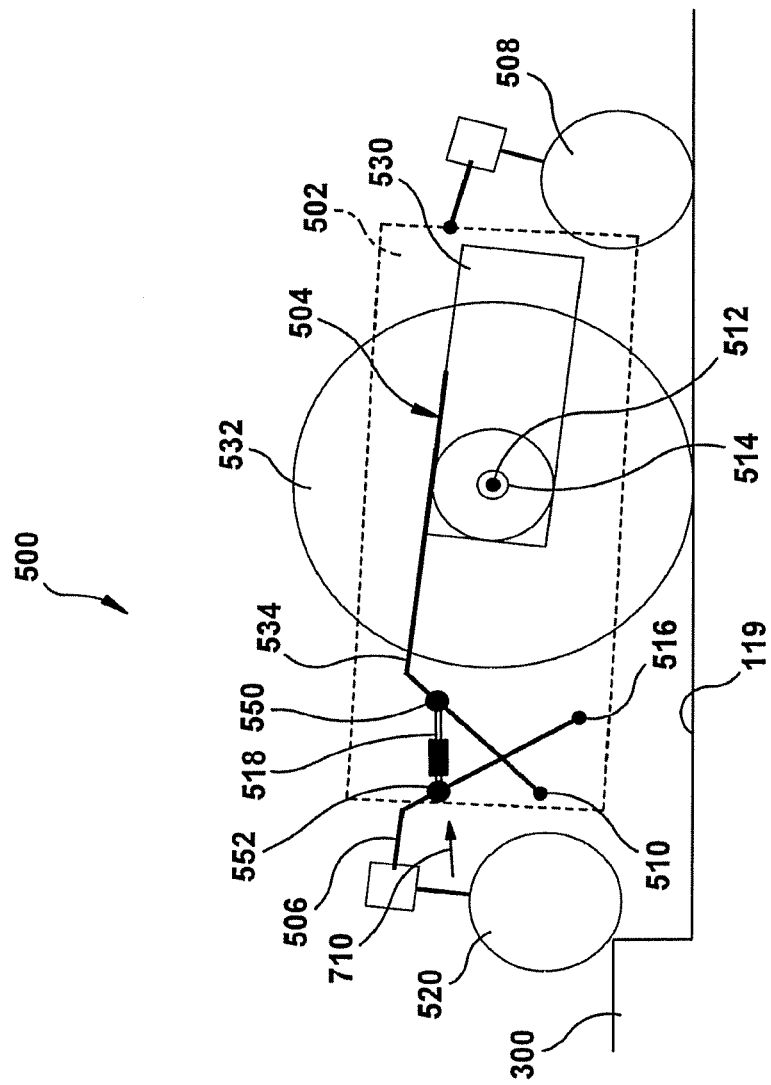
FIG. 7C is a side view of a wheelchair suspension with a variable length motion transfer member traversing a raised obstacle.

FIGS. 7B and 7C illustrate an embodiment of the suspension 500 traversing over the obstacle 300, where the link 518 is a variable length link. In this embodiment, the drive assembly pivot arm 534 pulls the link 518 to extend the link to its maximum length or a length where the front caster pivot arm 506 begins to pivot. Once extended, the link 518 pulls the front caster pivot arm 506 to pivot as indicated by arrow 704 around pivot axis 516. This causes front caster 520 to rise above obstacle 300 or urges the front caster upward to assist the front caster over the obstacle 300. Referring to FIG. 7C, when the front caster 520 engages the obstacle 300, the front caster pivot arm 506 pivots as indicated by arrow 710 and the link 518 compresses to absorb shock that results from the impact between the front caster 520 and the obstacle 300.

Figure 8A:
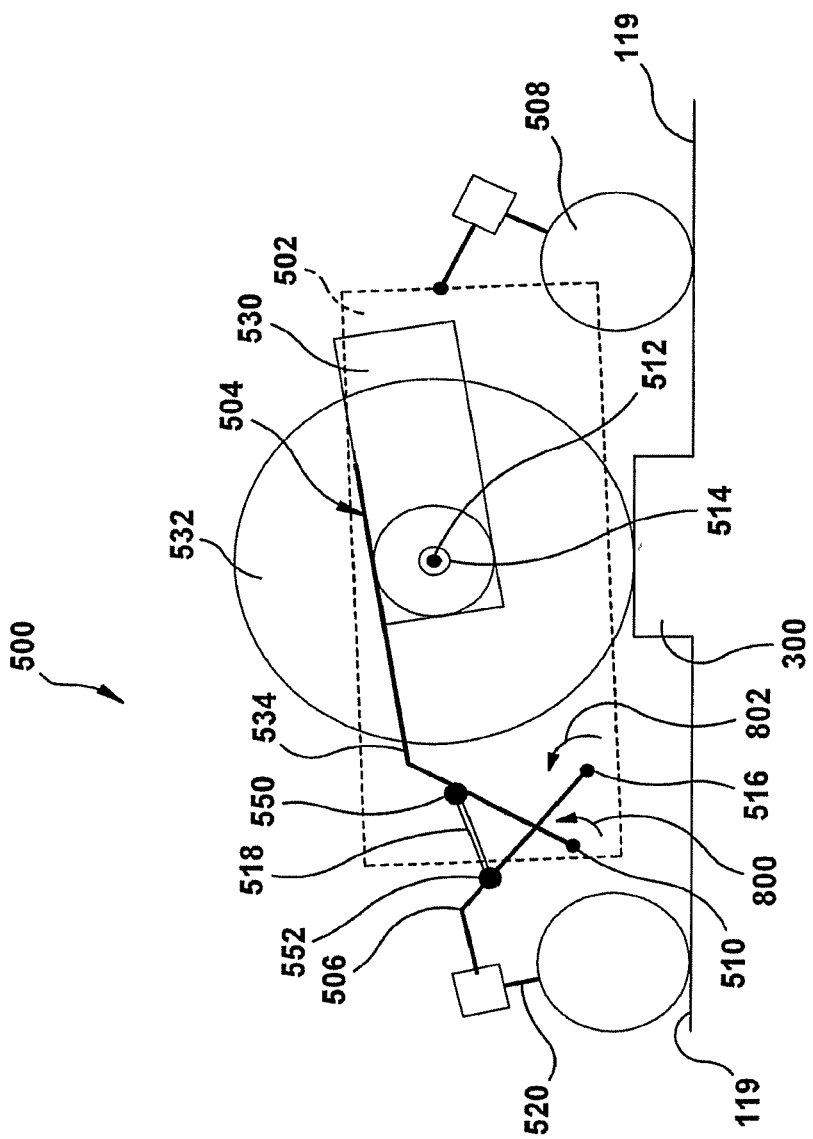
FIG. 8A is a side view of the wheelchair suspension of FIG. 5 traversing a raised obstacle.

Illustrated in FIG. 8A is a side elevational view of the suspension 500 with the drive wheel 532 traversing the obstacle 300. When the drive wheel 532 comes into contact with the obstacle 300, the drive assembly 504 pivots in the direction indicated by arrow 800 around pivot axis 510. The rotation of the drive assembly 504 is translated to the front caster pivot arm 506 to lower the caster 520 down onto the lower driving surface elevation. When the link 518 is a rigid member, the drive assembly 504 and the front caster pivot arm 506 act in unison. One or more springs (not shown) may optionally be included to bias the front caster pivot arm 506 in the direction indicated by arrow 802.

Figure 8B:
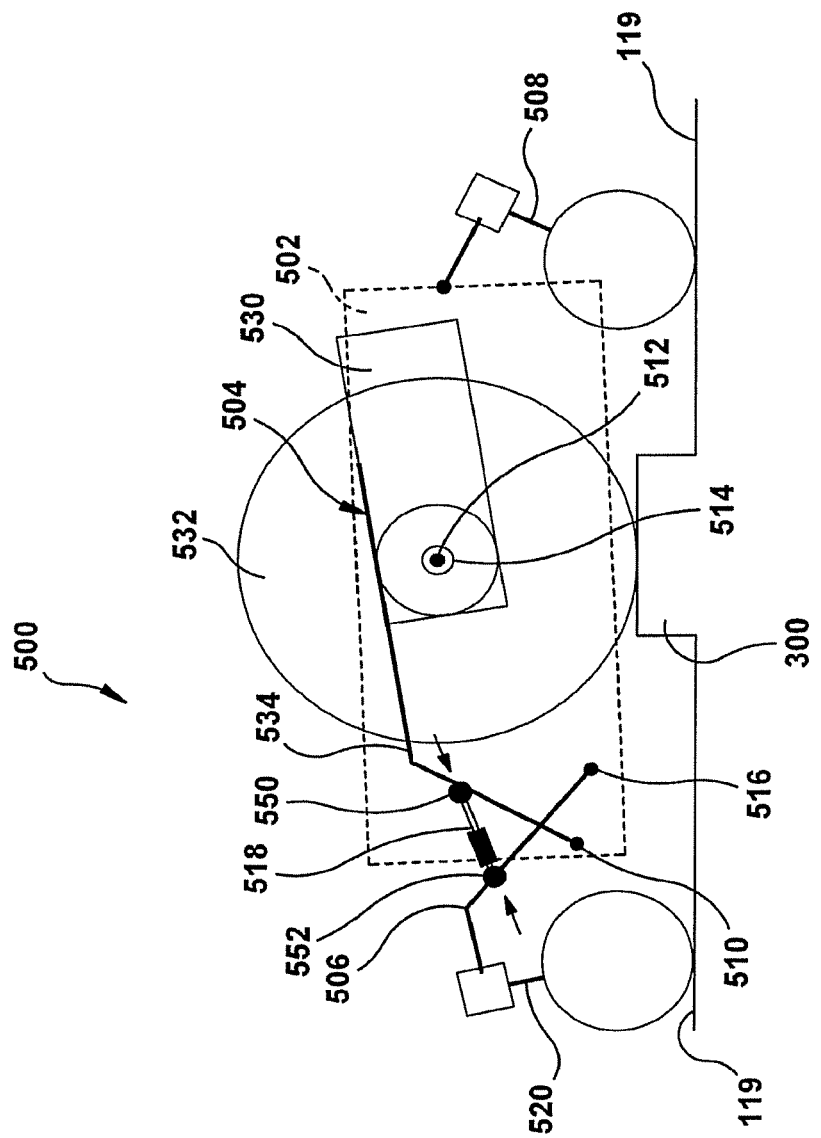
FIG. 8B is a side view of a wheelchair suspension with a variable length motion transfer member traversing a raised obstacle.

FIG. 8B illustrates an embodiment of the suspension 500 with the drive wheel 532 traversing over the obstacle 300, where the link 518 is a variable length link. When the drive wheel 532 comes into contact with obstacle 300, the drive assembly 504 pivots in the direction indicated by arrow 810 around pivot axis 510 to soften the impact from the obstacle 300 that is transferred to the frame 502. During such pivotal movement of the drive assembly 504, the link 518 compresses to allow pivoting of the drive assembly 504 with respect to the front caster pivot arm. Compressing of the link 518 absorbs shock that results from the impact between the drive wheel 532 and the obstacle 300. When the front caster 520 comes into contact with the support surface 519, the pivot arm 506 pivots in the direction indicated by arrow 812 around pivot axis 516 to soften the impact with the support surface 119 that is transferred to the frame 502. During such pivotal movement of the pivot arm 506, the link 518 compresses to allow pivoting of the front caster pivot arm 506 with respect to the drive assembly. Compressing of the link 518 absorbs shock that results from the impact between the front caster 520 and the obstacle 300.

Figure 8C:
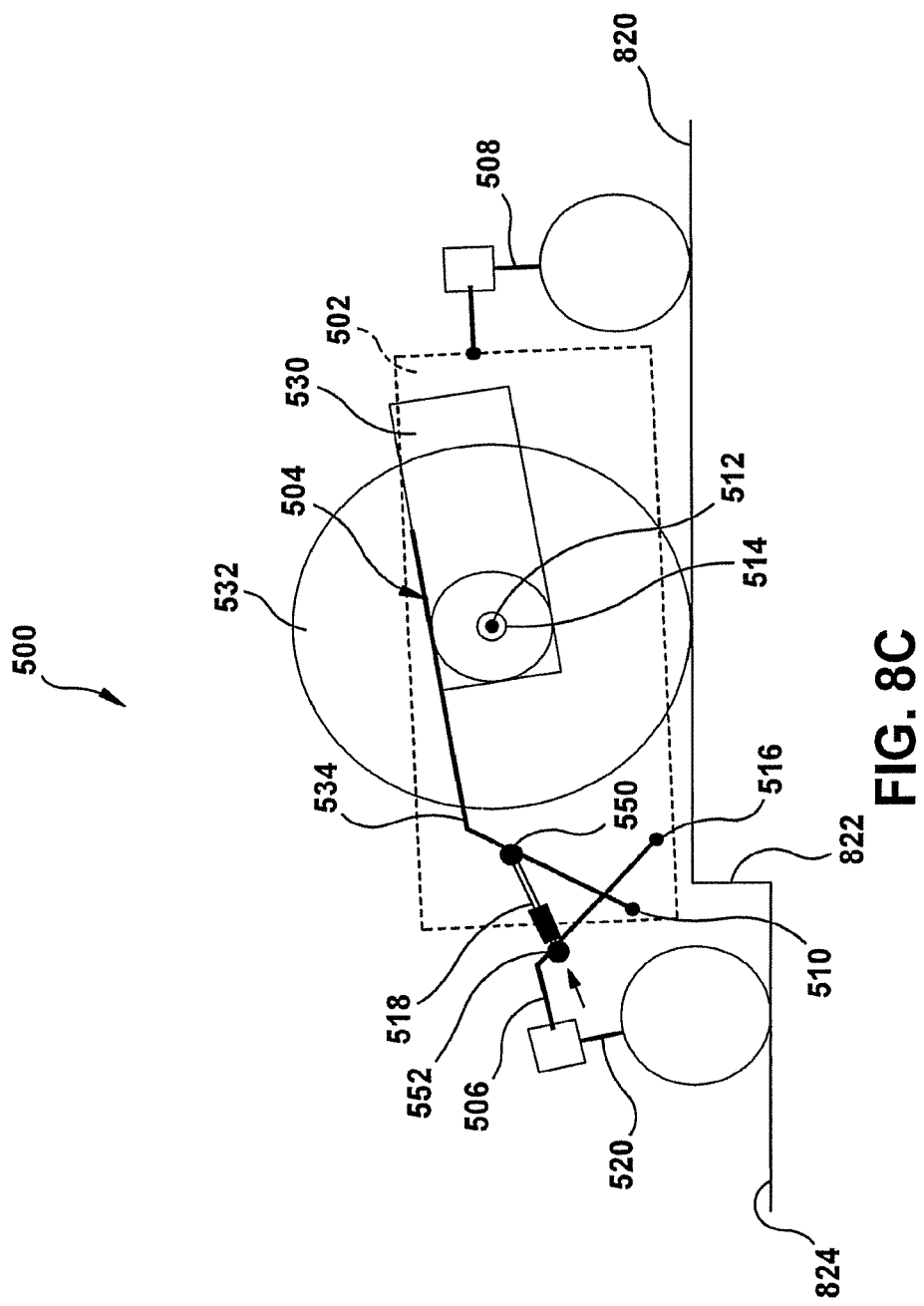
FIG. 8C is a side view of a wheelchair suspension with a variable length motion transfer member traversing a lowered obstacle.

FIG. 8C illustrates an embodiment of the suspension 500 with the drive wheel 532 descending from an elevated surface 820 with a step 822 to a lower surface 824, where the link 518 is a variable length link When the front caster 520 reaches the step 822, the front caster 520 and the front caster pivot arm 506 begin to move downward. The weight of the front caster pivot arm 506 and front caster 520, in addition to any weight supported by the front caster 520, pulls the link 518 to extend the link to its maximum length or until the front caster 520 engages the lower surface 824. By allowing the front caster 520 to drop down and/or engage the lower surface 824 before the drive wheel reaches the step, the front caster 520 and the link 518 can absorb shock that results from the drive wheel 532 moving from the upper surface 420 to the lower surface 424.

Figure 9:
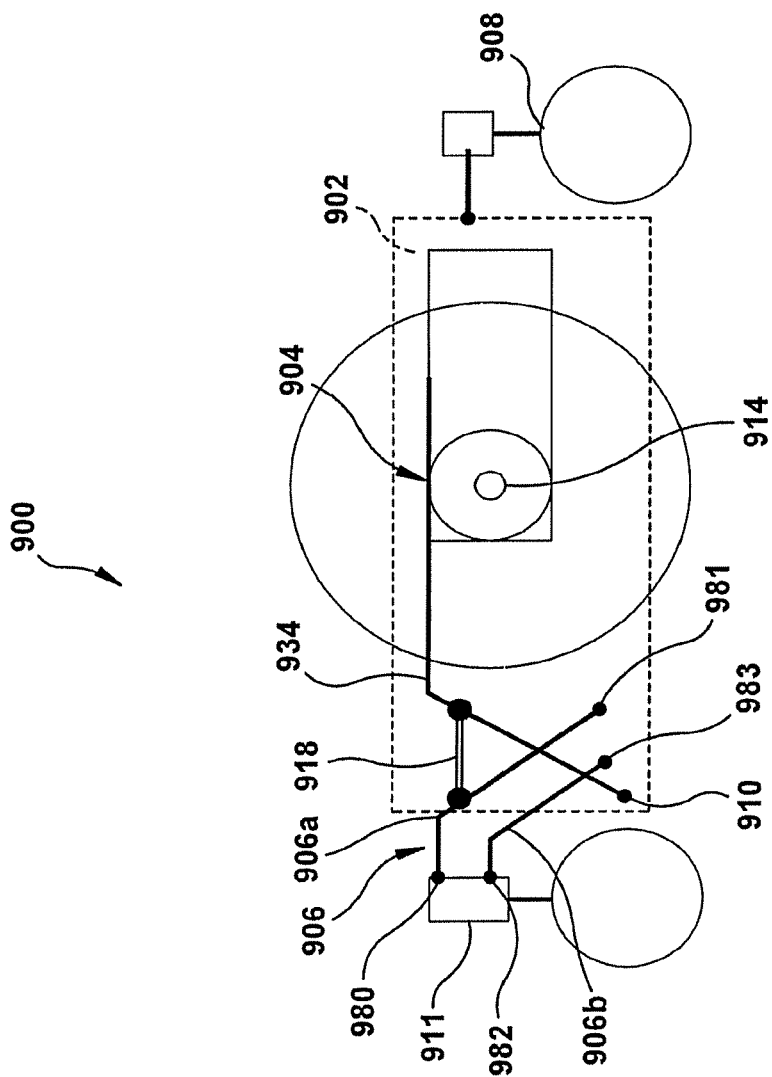
FIG. 9 is a side view of an embodiment of a wheelchair suspension with a front caster pivot arm that comprises links of a four-bar linkage.
Figure 10:
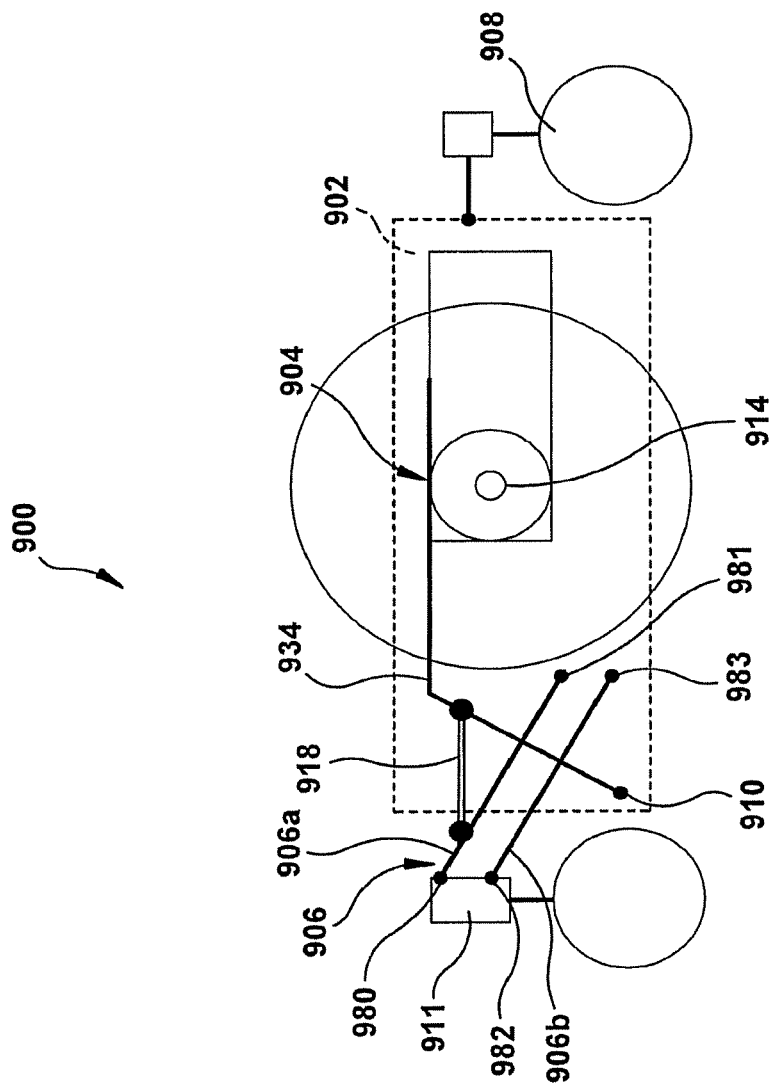
FIG. 10 is a side view of a second configuration of the wheelchair suspension of FIG. 9.
Figure 11:
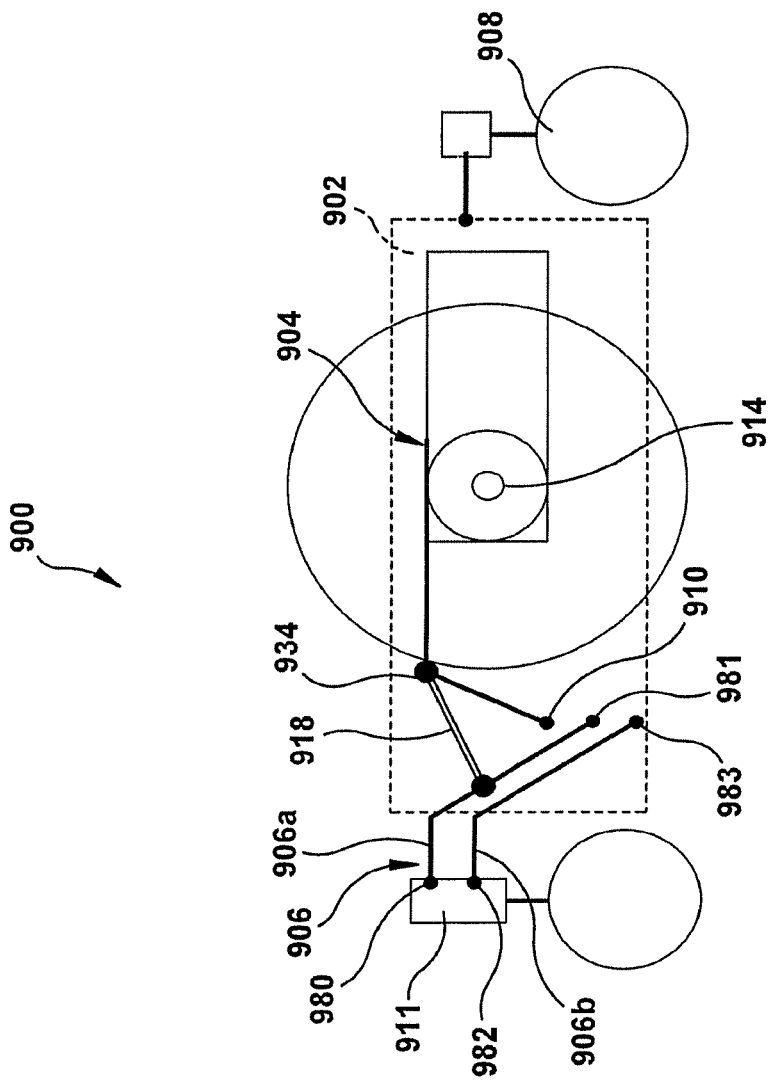
FIG. 11 is a side view of a third configuration of the wheelchair suspension of FIG. 9.

FIGS. 9, 10, and 11 illustrate embodiments of a wheelchair suspension 900 where a front caster pivot arm 906 comprises links of a four bar linkage. In the configurations illustrated by FIGS. 9 and 10, a drive assembly pivot arm 934 and the front caster pivot arm 906 are in a crossed configuration. In the configuration illustrated by FIG. 11, the drive assembly pivot arm 934 and the front caster pivot arm 906 are not in a crossed configuration.

The wheelchair suspensions 900 illustrated by FIGS. 9, 10, and 11 each include a frame 902, a drive assembly 904, a front caster pivot arm 906, and a rear caster 908. The drive assembly 904 is pivotally mounted to the frame 902 at a drive assembly pivot axis 910. The front caster pivot arm 906 comprises an upper link 906a and a lower link 906b. The upper link 906a is pivotally coupled to a caster support member 911 at a pivotal connection 980 and is pivotally connected to the frame 902 at a pivotal connection 981. The lower link 906b is pivotally coupled to the caster support member 911 at a pivotal connection 982 and is pivotally connected to the frame 902 at a pivotal connection 983.

The caster support member 911 may be any structure that allows links 906a, 906b to be coupled to the caster 920. The links 906a, 906b, the frame 902, and the caster support member 911 form a four-bar linkage. The pivotal connections 980, 981, 982, 983 can be positioned at a wide variety of different locations on the frame 902 and the caster support member 911 and the length of the links 906 can be selected to define the motion of the caster 920 as the front caster pivot arm 906 is pivoted. In the example illustrated by FIG. 9, the front caster pivot aim 906 retracts the front caster 920 or pivots the wheel of the front caster toward the frame as the pivot arm 906 is lifted and extends the front caster 920 or pivots the wheel of the front caster 920 away from the frame as the front caster pivot arm is lowered. In the example illustrated by FIG. 10, the four-bar linkage defines a parallelogram. As such, the orientation of the front caster 920 does not change as the pivot arm pivots.

In the configurations illustrated by FIGS. 9 and 10, the drive assembly pivot axis 910 is below the pivotal connections 981, 983 of the front caster pivot arm links and a drive axle 914 and is in front of at least one of the pivotal connections 981, 983 of the front caster pivot arm 906. The drive assembly pivot arm 934 and the front caster pivot arm 906 are in a crossed configuration when viewed from the side. The front caster pivot arm 906 and the drive assembly pivot arm 934 may be laterally offset, or may be bent to accommodate the crossed configuration. By arranging the front caster pivot arm 906 and the drive assembly pivot arm 934 in the crossed configuration, the length of the front caster pivot arm 906 and/or the drive assembly pivot arm 934 can be increased. In the configuration illustrated by FIG. 11, the drive assembly pivot axis 910 is above the pivotal connections 981, 983 of the front caster pivot arm links, but below the drive axle 914. The drive assembly pivot arm 934 and the front caster pivot arm 906 do not cross.

The drive assembly 904 and the front caster pivot arm 906 can be coupled in any manner that transfers at least a portion of motion of the drive assembly in at least one direction to the pivot arm 906. In the embodiments illustrated by FIGS. 9, 10, and 11, the front caster pivot arm 906 is coupled to the drive assembly 904 by a link 918 that is pivotally connected to the drive assembly 904 and the upper link 906a of the front caster pivot arm 906. The link could also be connected to the drive assembly 904 and the lower link 906b of the front caster pivot arm 106. The link 918 can be a fixed length link, a rigid link, a flexible link and/or may be a variable length link. The link 918 transfers motion of the drive assembly 904 to the front caster pivot arm. Torque applied by the drive assembly 904 urges the front caster pivot arm 906 and the front caster 920 upward with respect to a support surface 119.

Figure 12:
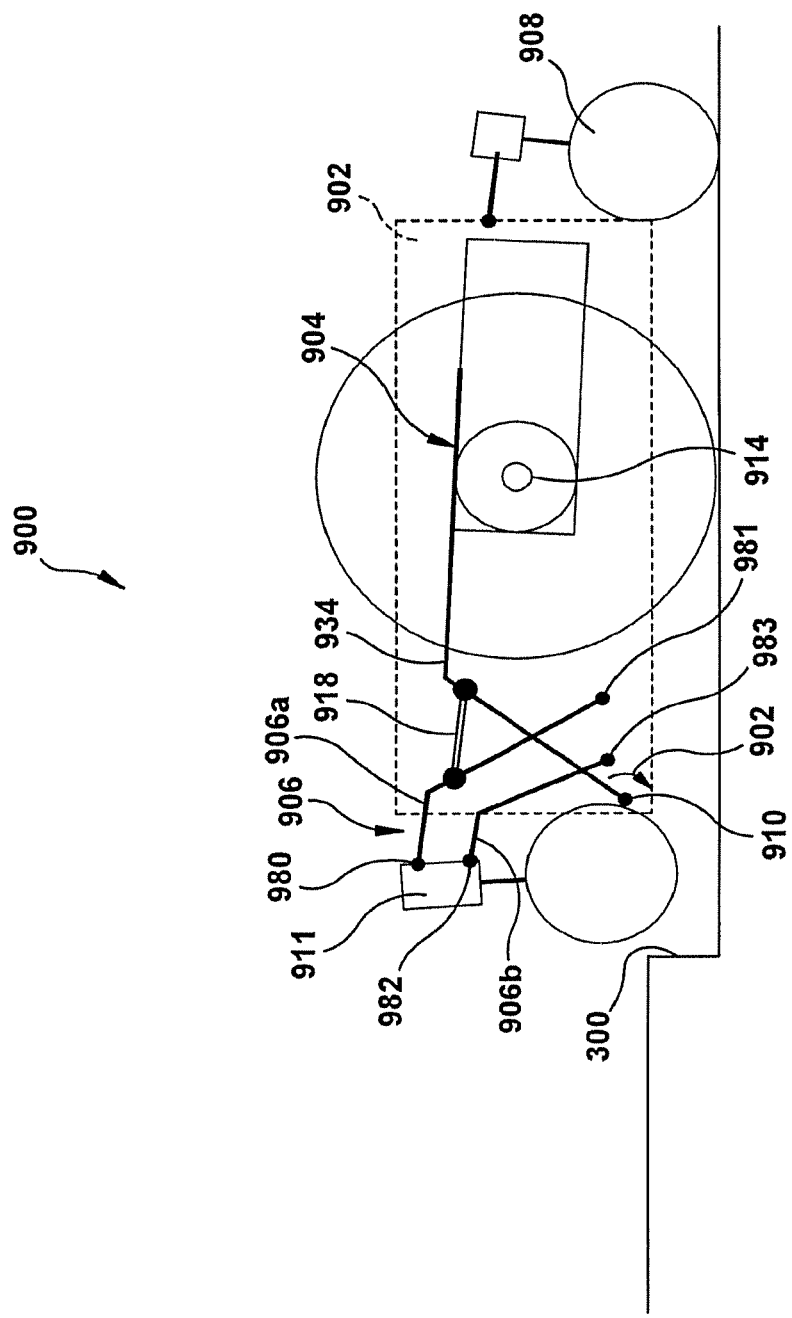
FIG. 12 is a side view of the wheelchair suspension of FIG. 9 traversing a raised obstacle.
Figure 13:
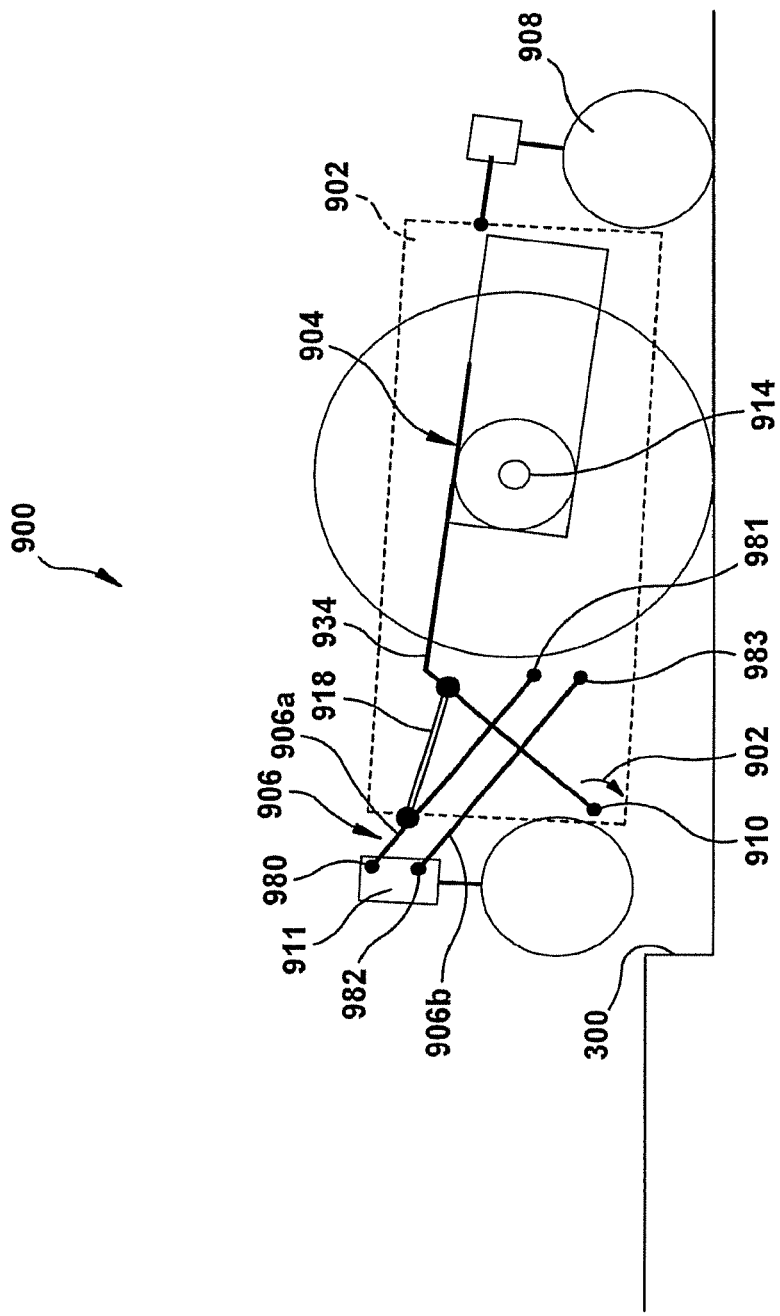
FIG. 13 is a side view of the wheelchair suspension of FIG. 10 traversing a raised obstacle.
Figure 14:
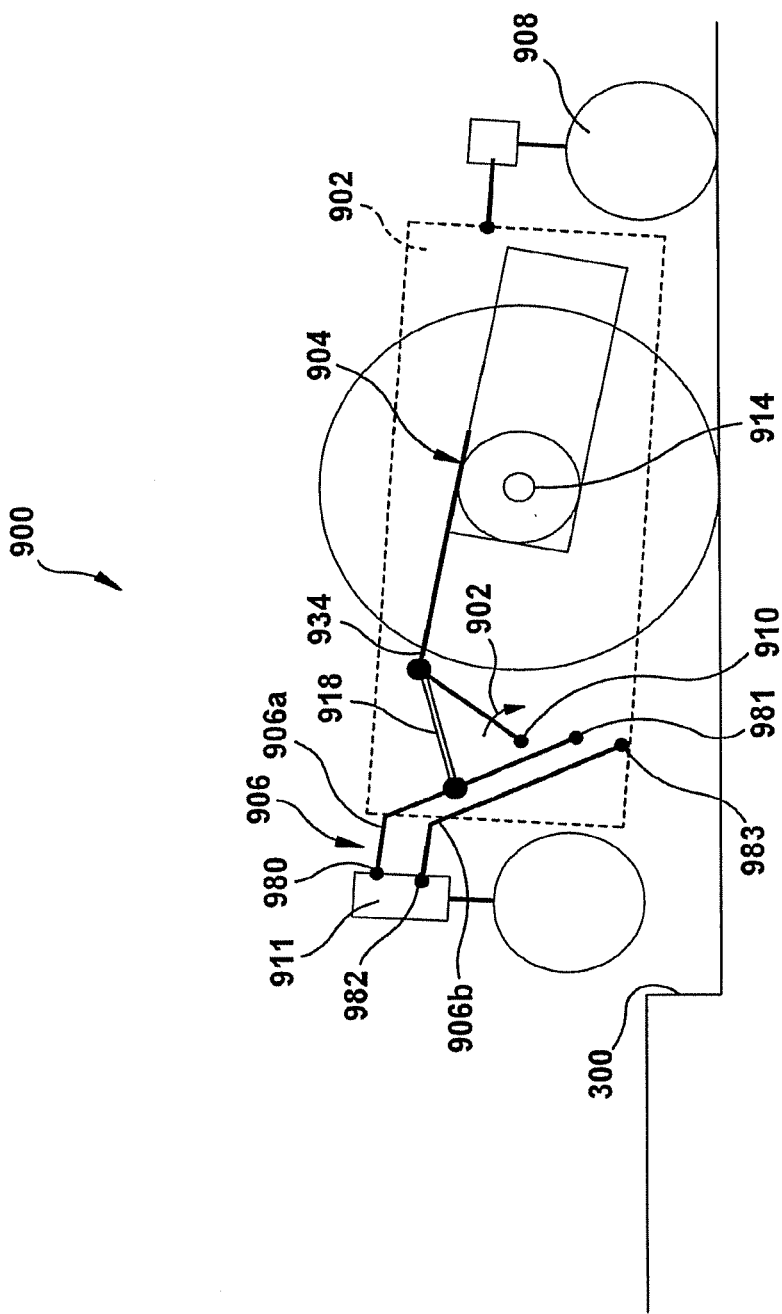
FIG. 14 is a side view of the wheelchair suspension of FIG. 11 traversing a raised obstacle.

FIGS. 12, 13, and 14 are elevational views of the suspensions 900 of FIGS. 9, 10 and 11 traversing over an obstacle 300 by ascending the obstacle. The drive assembly 904 pivots as indicated by arrow 902 around pivot axis 910. The drive assembly pivot arm 934 pulls the link 918, which pulls the front caster pivot arm 906. The front caster pivot arm 906 urges the front caster 920 upward and toward the frame 902. This causes front caster 920 to rise above obstacle 300 or urges the front caster upward and toward the frame 920 to assist the front caster over the obstacle 300.

Figure 15:
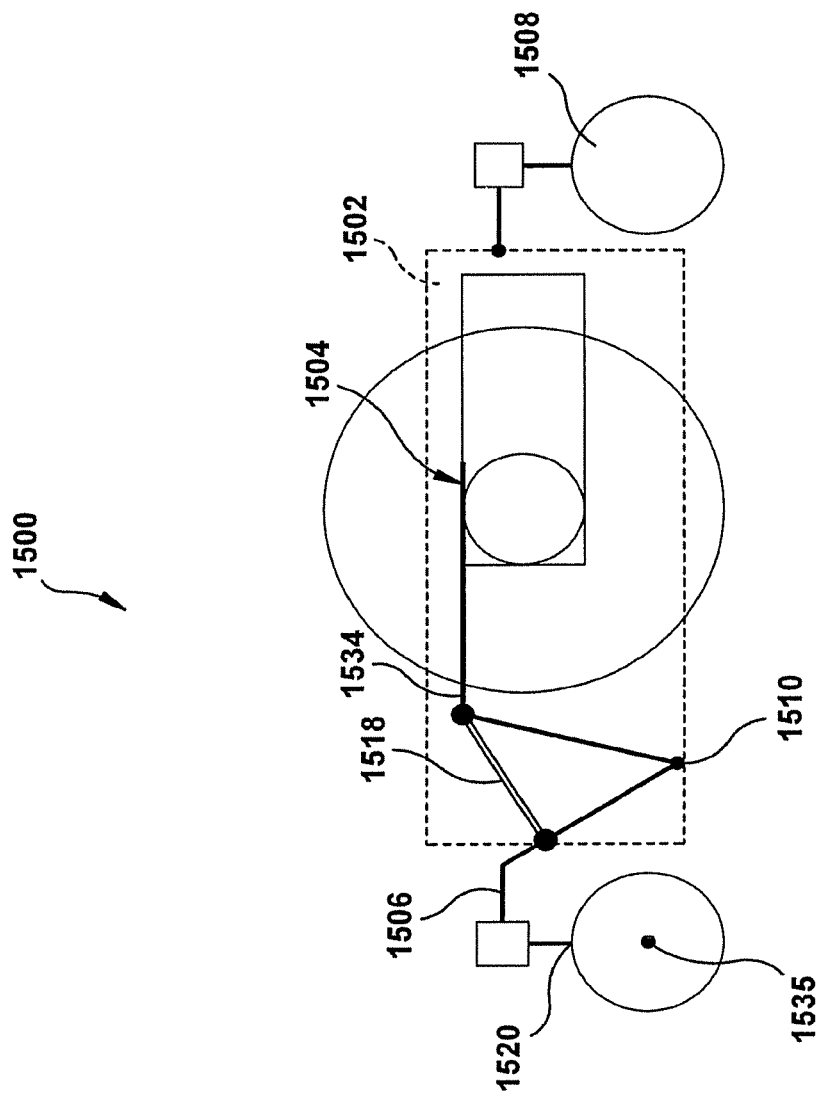
FIG. 15 is a side view of an embodiment of a wheelchair suspension.

FIG. 15 illustrates an embodiment of a wheelchair suspension 1500 where a front caster pivot arm 1506 and a drive assembly pivot arm 1534 pivot about a common axis 1510. The wheelchair suspension 1500 illustrated by FIG. 15 includes a frame 1502, a drive assembly 1504, a front caster pivot arm 1506, and a rear caster 1508. The drive assembly 1504 and the front caster pivot arm 1506 are pivotally mounted to the frame 1502 at the common pivot axis 1510. In the configuration illustrated by FIG. 15, the common pivot axis 1510 is below both an axle 1535 of the caster and a drive axle 1514 of the drive assembly 1504. In another embodiment, the common pivot axis 1510 is above the caster axle 1535, but below the drive axle 1514.

The drive assembly 1504 and the front caster pivot arm 1506 can be coupled in any manner. In the embodiment illustrated by FIG. 15, the front caster pivot arm 1506 is coupled to the drive assembly 1504 by a link 1518 that is pivotally connected to the drive assembly 1504 and the front caster pivot arm 1506. The link 1518 can be a fixed length link, a rigid link, a flexible link and/or may be a variable length link. The link 1518 transfers motion of the drive assembly 1504 to the front caster pivot arm. Torque applied by the drive assembly 1504 urges the front caster pivot arm 1506 and the front caster 1520 upward with respect to a support surface 119.

Figure 16:
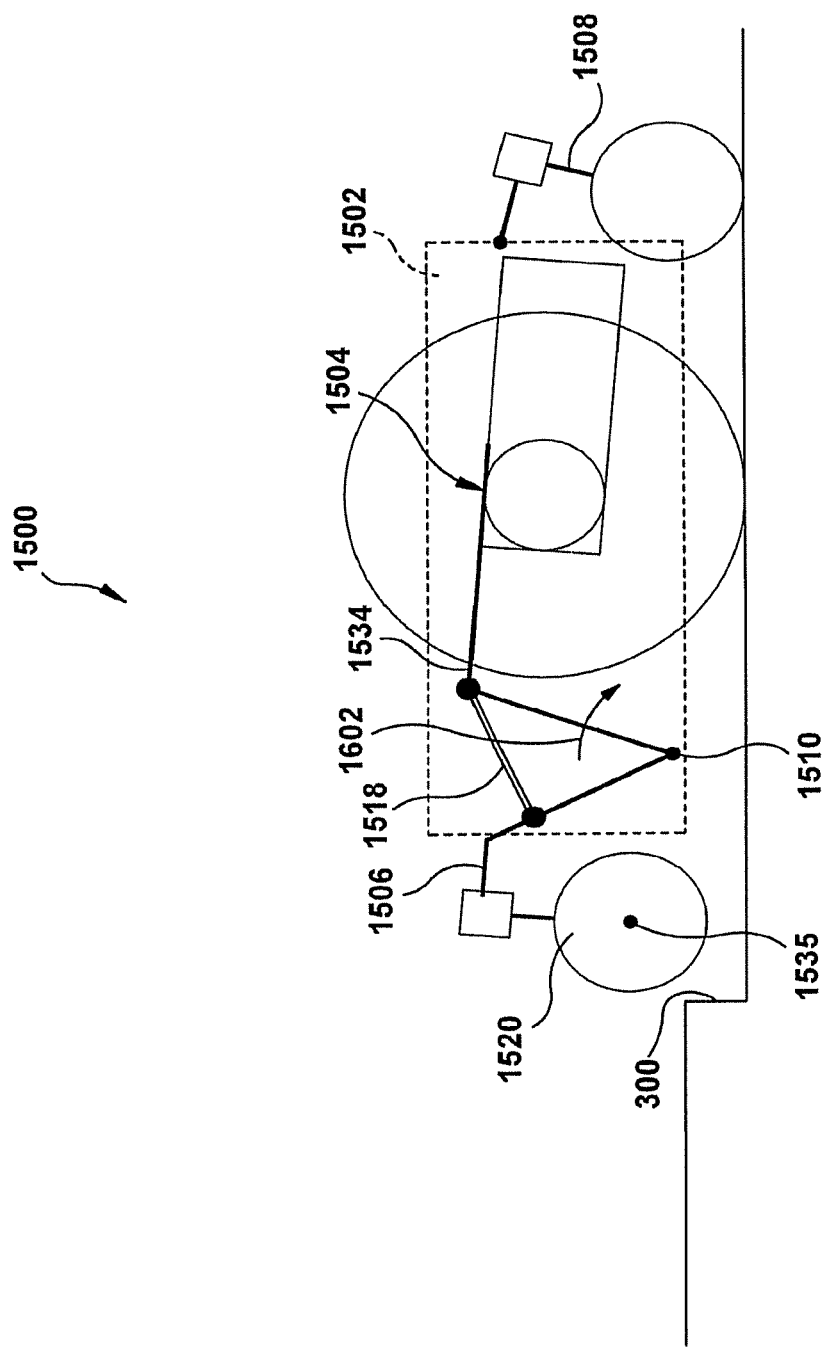
FIG. 16 is a side view of the wheelchair suspension of FIG. 15 traversing a raised obstacle.

FIG. 16 is an elevational view of the suspension 1500 traversing over an obstacle 300 by ascending the obstacle. The drive assembly 1504 pivots as indicated by arrow 1602 around pivot axis 1510. The drive assembly pivot arm 1534 pulls the link 1518, which pulls the front caster pivot arm 1506 to urge the front caster 1520 upward. This causes front caster 1520 to rise above obstacle 300 or urges the front caster upward to assist the front caster over the obstacle 300.

Figure 17:
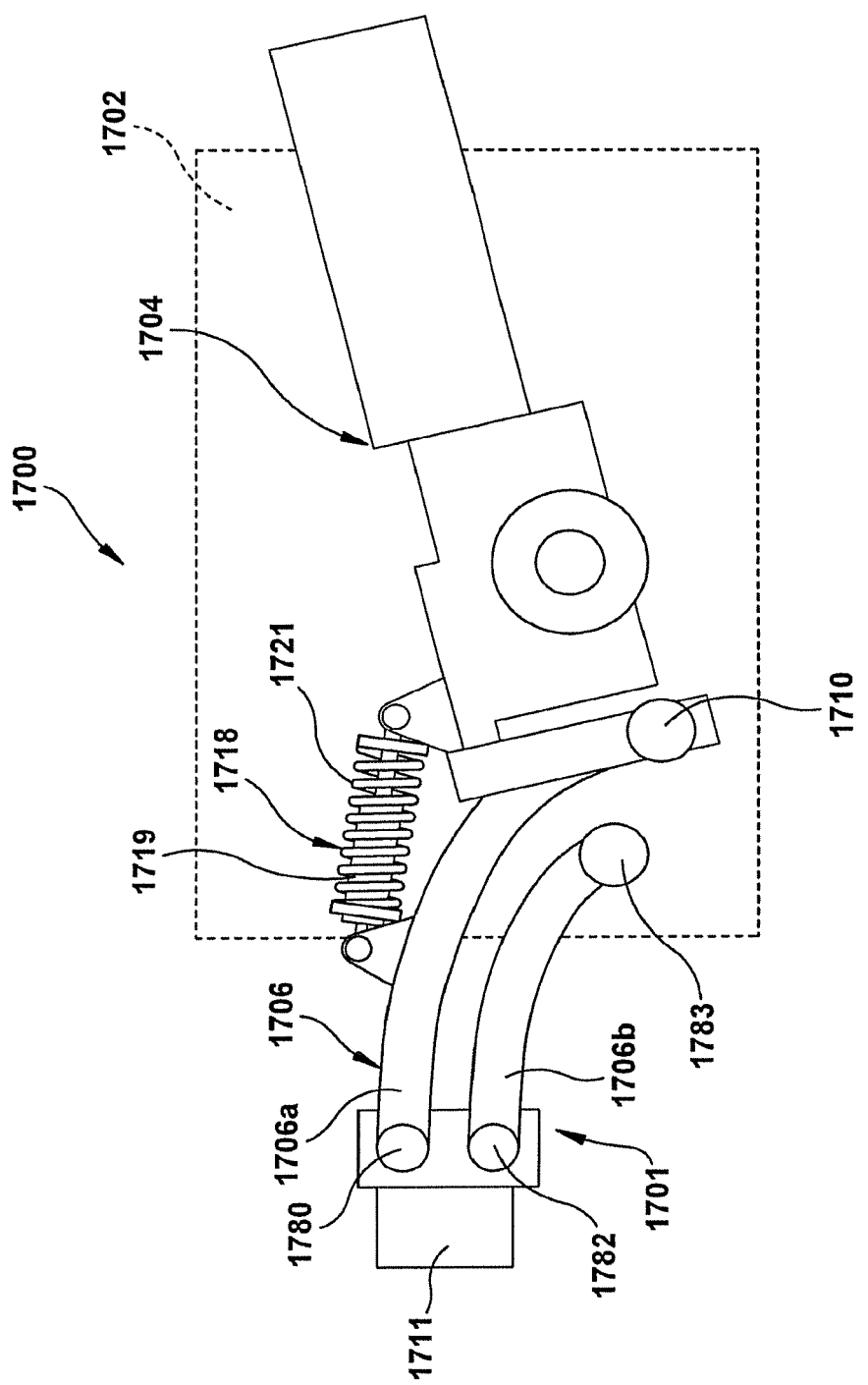
FIG. 17 is a side view of an embodiment of a wheelchair suspension.
Figure 18:
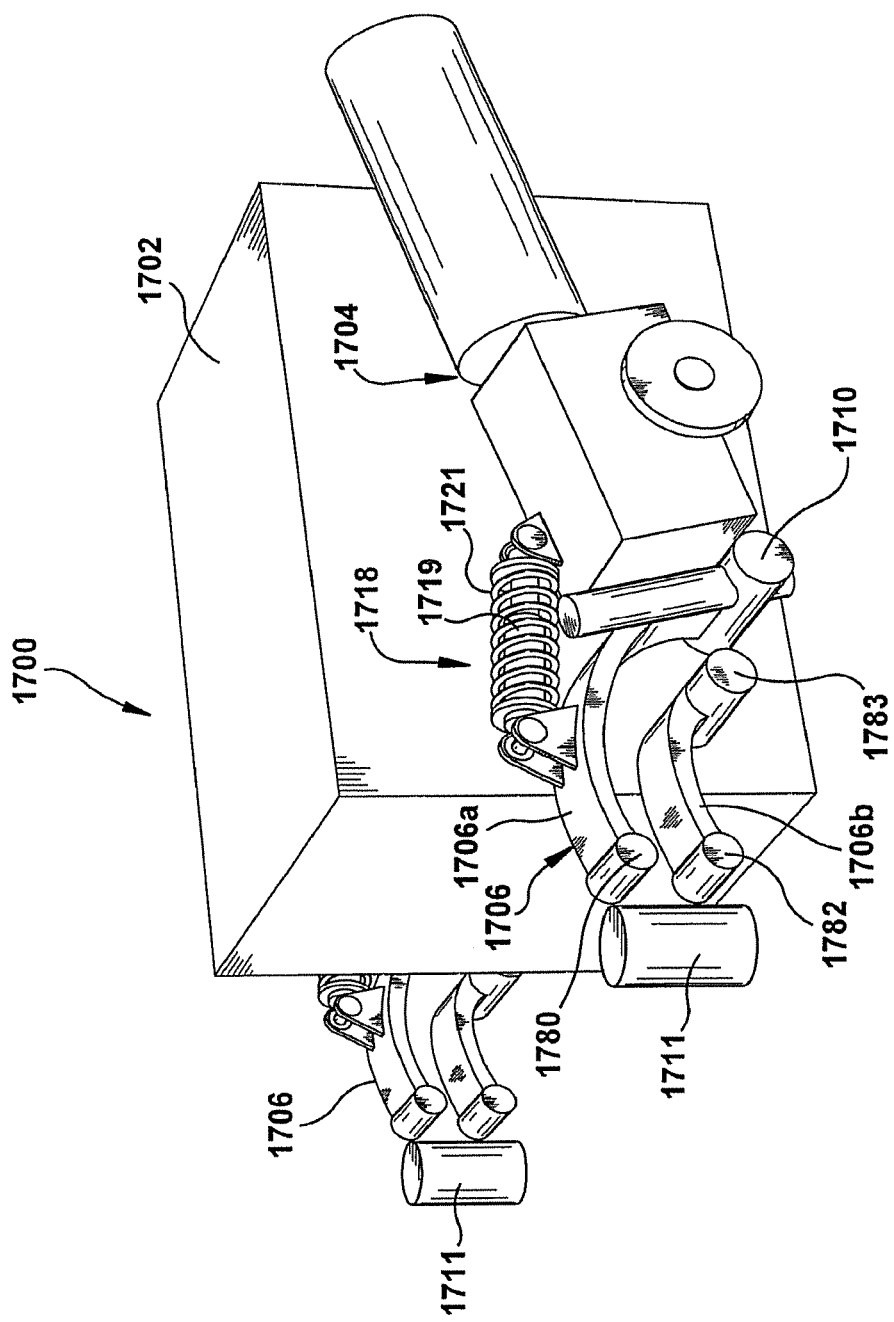
FIG. 18 is a perspective view of the wheelchair suspension of FIG. 17.

FIGS. 17 and 18 illustrate an embodiment of a wheelchair suspension 1700 where the a front caster pivot arm 1706 comprises links of a four bar linkage 1701 and a drive assembly 1704 and one of the links of front caster pivot arm 1706 pivot about a common axis 1710. The wheelchair suspension 1700 illustrated by FIGS. 17 and 18 includes a frame 1702, a drive assembly 1704, a front caster pivot arm 1706, and may include a rear caster (not shown). The drive assembly 1704 is pivotally mounted to the frame 1702 the common pivot axis. The front caster pivot arm 1706 comprises an upper link 1706a and a lower link 1706b. The upper link 1706a is pivotally coupled to a caster support member 1711 at a pivotal connection 1780 and is pivotally connected to the frame 1702 at the drive assembly pivot axis 1710. The lower link 1706b is pivotally coupled to the caster support member 1711 at a pivotal connection 1782 and is pivotally connected to the frame 1702 at a pivotal connection 1783. The links 1706a, 1706b, the frame 1702, and the caster support member 1711 form a four-bar linkage. In the example illustrated by FIGS. 17 and 18, the front caster pivot arm 1706 retracts the front caster 1720 as the pivot arm 1706 is lifted and extends the front caster 1720 as the front caster pivot arm 1706 is lowered.

In the embodiment illustrated by FIGS. 17 and 18, the front caster pivot aim 1706 is coupled to the drive assembly 1704 by a link 1718 that is pivotally connected to the drive assembly 1704 and the upper link 1706a of the front caster pivot arm 1706. The illustrated link 1718 is a coil over shock arrangement that comprises a variable length shock absorber 1719 with a spring or coil 1721 disposed around the shock absorber. The shock absorber 1719 absorbs shock that results from impacts sustained by the front caster or the drive wheel. The coil 1721 biases the shock absorber to an extended position. The link 1718 transfers motion of the drive assembly 1704 to the front caster pivot arm. Torque applied by the drive assembly 1704 urges the front caster pivot arm 706 and the front caster 1720 upward with respect to a support surface 119.

Figure 19:
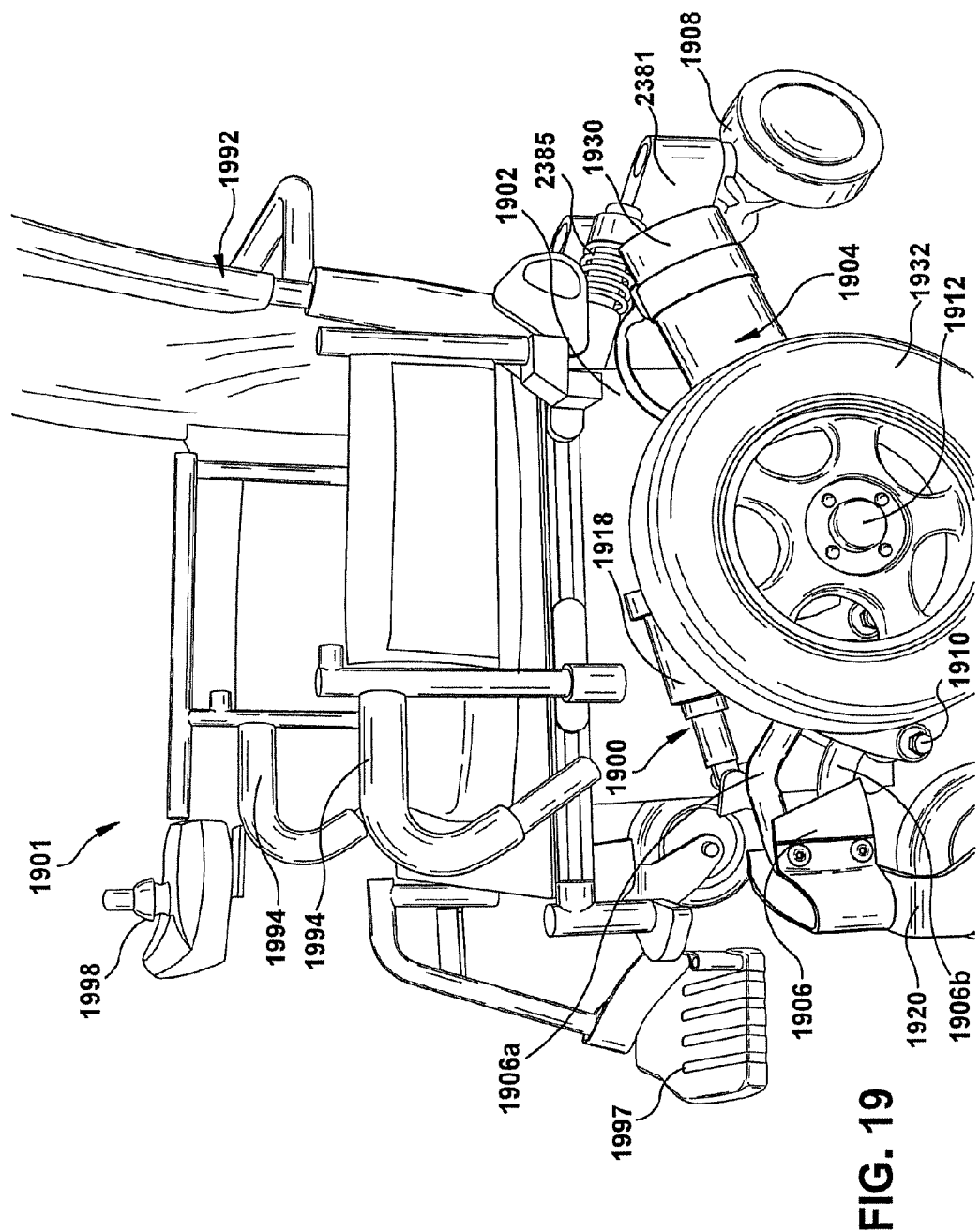
FIG. 19 is a perspective view of a wheelchair.
Figure 20:
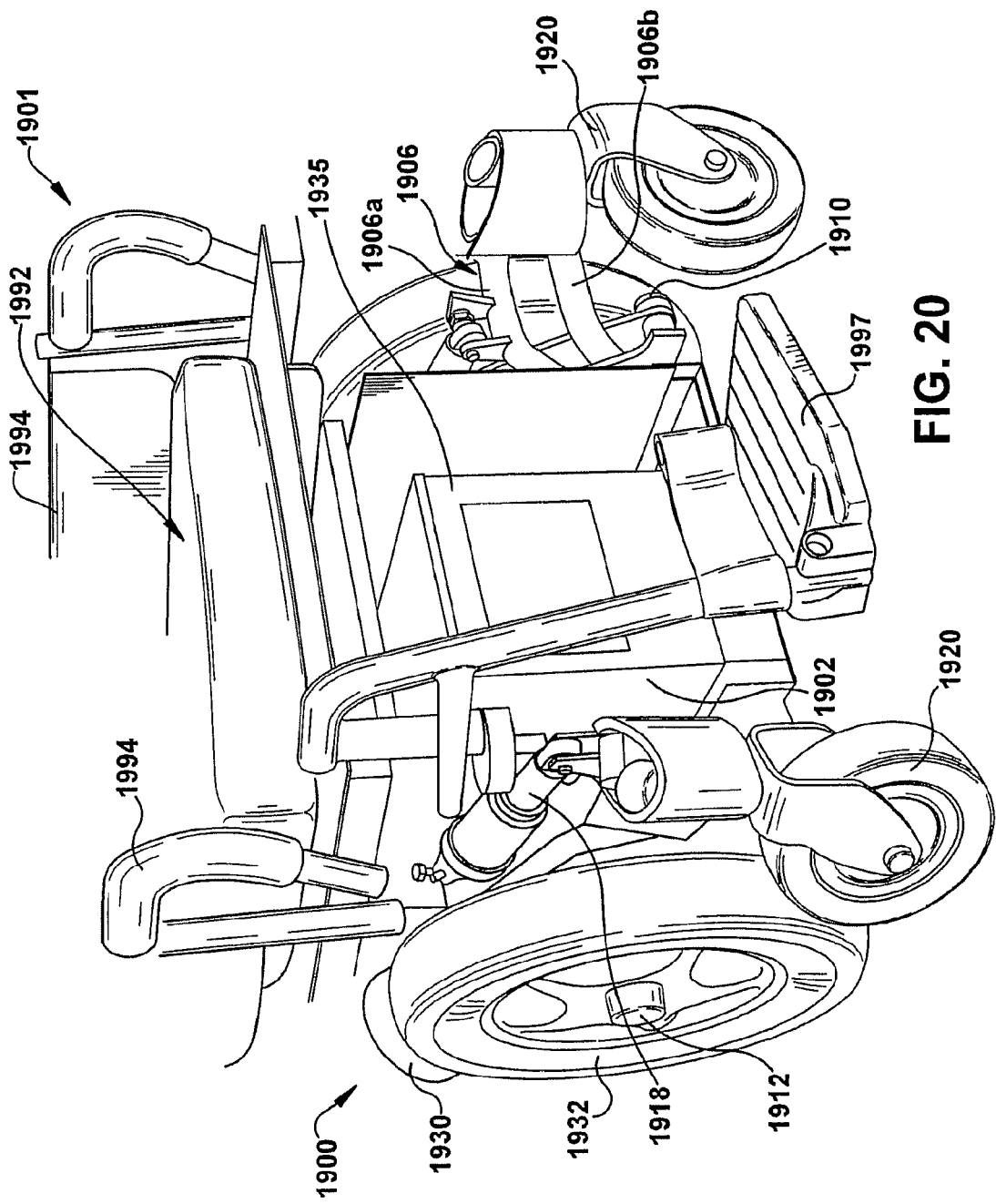
FIG. 20 is a second perspective view of the wheelchair of FIG. 19.

FIGS. 19 and 20 are perspective views of a wheelchair 1901 that includes a suspension 1900. The wheelchair 1901 is preferably a mid-wheel drive or rear-wheel drive wheelchair, but may be any type of wheelchair. As shown, the wheelchair 1901 has a chair 1992 having arm supports 1994. A control device such as, for example, a joystick controller 1998 (FIG. 1A) is attached to the chair 1992 for controlling any power-related aspects of the wheelchair 1901. Projecting forward from the chair 1992 is a footrest 1997 for supporting the feet of the wheelchair's user.

Figure 21:
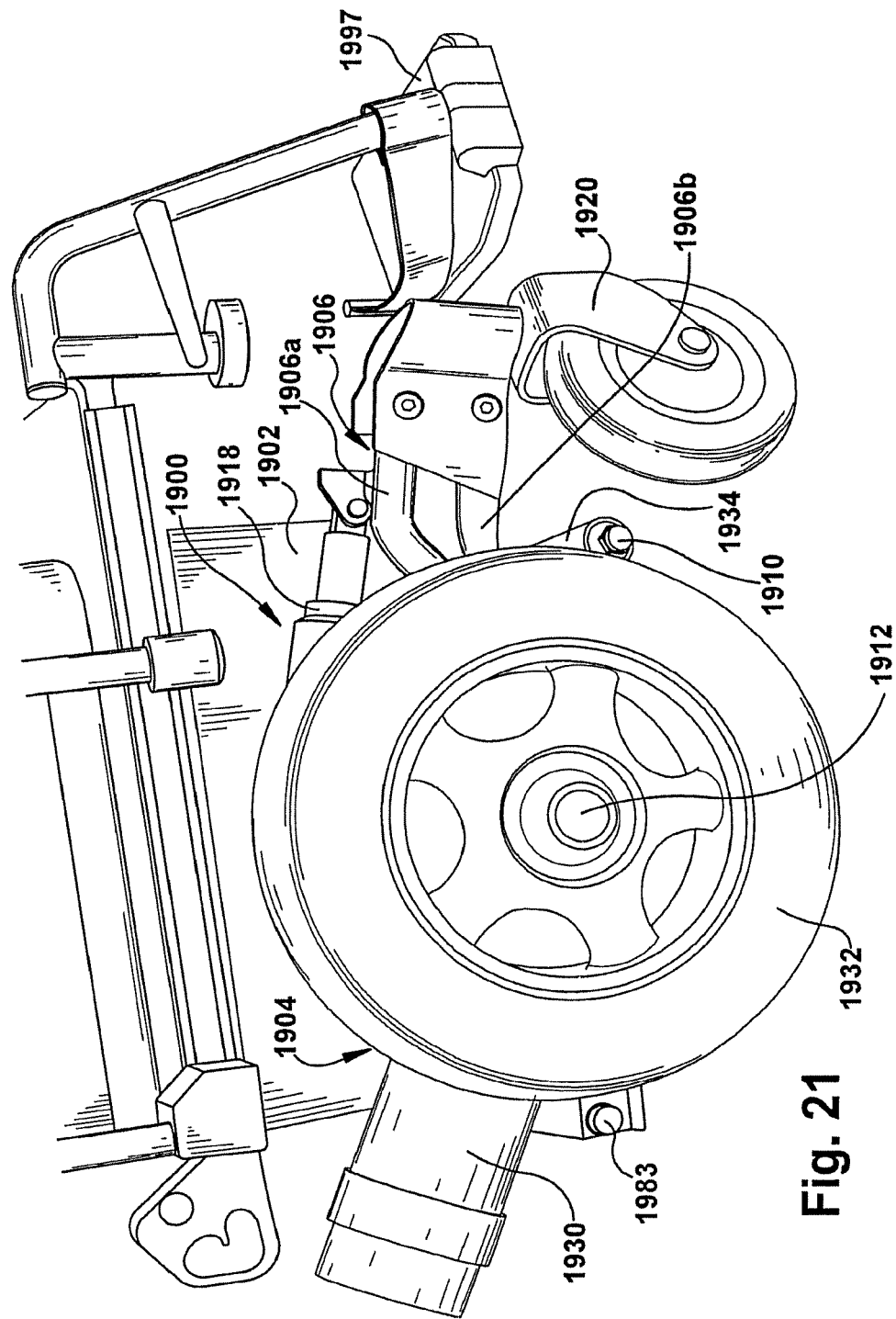
FIG. 21 is an enlarged side view of the wheelchair of FIG. 19 showing suspension components of the wheelchair.
Figure 22:
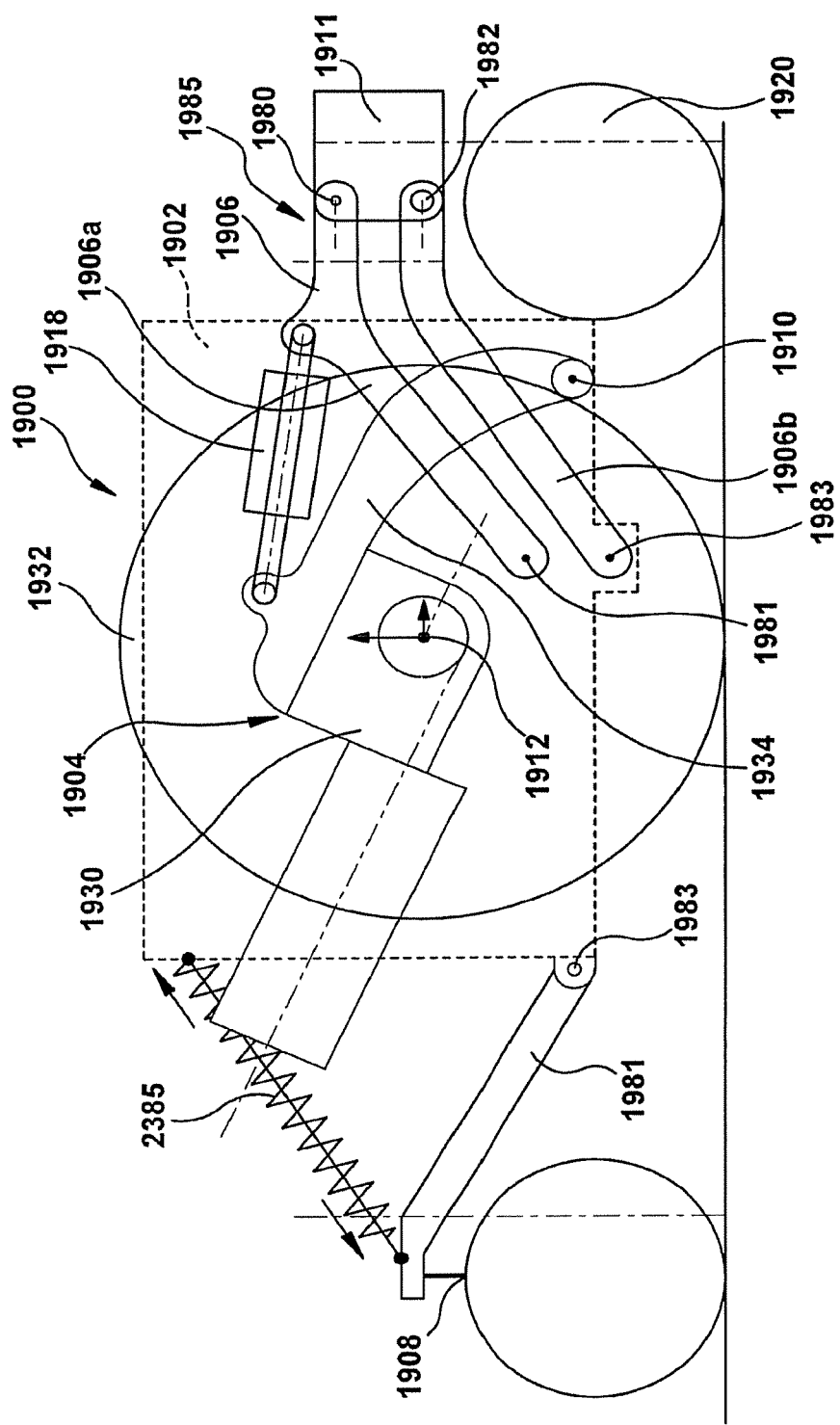
FIG. 22 is a view similar to FIG. 26 with a drive wheel shown transparently to more clearly illustrate operation of the suspension components.

The wheelchair 1901 may include the suspension illustrated in FIGS. 19-23, any of the suspension configurations described above, or any combination of the components of the suspension configurations described herein. Referring to FIGS. 21 and 22, the illustrated suspension 1900 includes a frame 1902, a drive assembly 1904, a front caster pivot arm 1906, and two rear casters 1908. The drive assembly 1904 is pivotally mounted to the frame 1902 at a drive assembly pivot axis 1910.

Each drive assembly 1904 includes a motor drive 1930, a drive wheel 1932, and a pivot arm 1934. The motor drive 1930 may comprise a motor/gear box combination, a brushless, gearless motor, or any other known arrangement for driving the drive wheel 1932. The motor drive 1930 is powered by one or more batteries 1935 (FIG. 20) to drive the drive wheel 1932 about the axis of rotation 1912. Referring to FIG. 22, the illustrated pivot arm 1934 comprises a steel plate that is fixed to the motor drive 1930. The pivot arm 1934 is pivotally coupled to the frame at the drive assembly pivot axis 1910. Referring to FIG. 22, the pivot arm 1934 extends forward and downward from the motor drive to the drive assembly pivot axis 110. The pivot axis 1910 of the drive assembly pivot aim 1934 is below the drive wheel axis of rotation 1912

Referring to FIG. 22, the front caster pivot arm 1906 comprises an upper link 1906a and a lower link 1906b. The upper link 906a is pivotally coupled to a caster support member 1911 at a pivotal connection 1980 and is pivotally connected to the frame 1902 at a pivotal connection 1981. The lower link 1906b is pivotally coupled to the caster support member 1911 at a pivotal connection 1982 and is pivotally connected to the frame 1902 at a pivotal connection 1983. In the embodiment illustrated by FIGS. 21 and 22, the pivotal connection 1983 is at or near the lowest point of the frame 1902. The links 1906a, 1906b, the frame 1902, and the caster support member 1911 form a four-bar linkage 1985 (See FIG. 22). In the configuration illustrated by FIGS. 21 and 22, the drive assembly pivot axis 1910 is at or near the lowest point of the frame 1902 and is in front of the pivotal connections 1981, 1983 of the front caster pivot arm 1906. The drive assembly pivot arm 1934 and the front caster pivot arm 1906 are in a crossed configuration.

In the embodiment illustrated by FIGS. 21 and 22, a shock absorber link 1918 is pivotally connected to the drive assembly 1904 and the front caster pivot arm 1906. The shock absorber link 1918 transfers motion of the drive assembly 1904 to the front caster pivot arm 1906. The shock absorber link 1918 is a variable length link, though it can also be a fixed length link. When the drive assembly 1904 is accelerated, the drive assembly pivot arm 1934 pulls the shock absorber link 1918 to extend the link to its maximum length or a length where it urges the front caster pivot arm 1906 to pivot. Once extended, the link 1918 pulls or urges the front caster pivot arm 1906 to pivot upward. This causes front caster 1920 to rise or urges the front caster 1920 upward. When the front caster 1920 engages an obstacle, the shock absorber link 1918 compresses to absorb shock from the impact between the front caster 1920 and the obstacle. When the drive wheel 1932 comes into contact with an obstacle, the shock absorber link 1918 compresses to absorb shock that results from the impact between the drive wheel and the obstacle.

Figure 23:
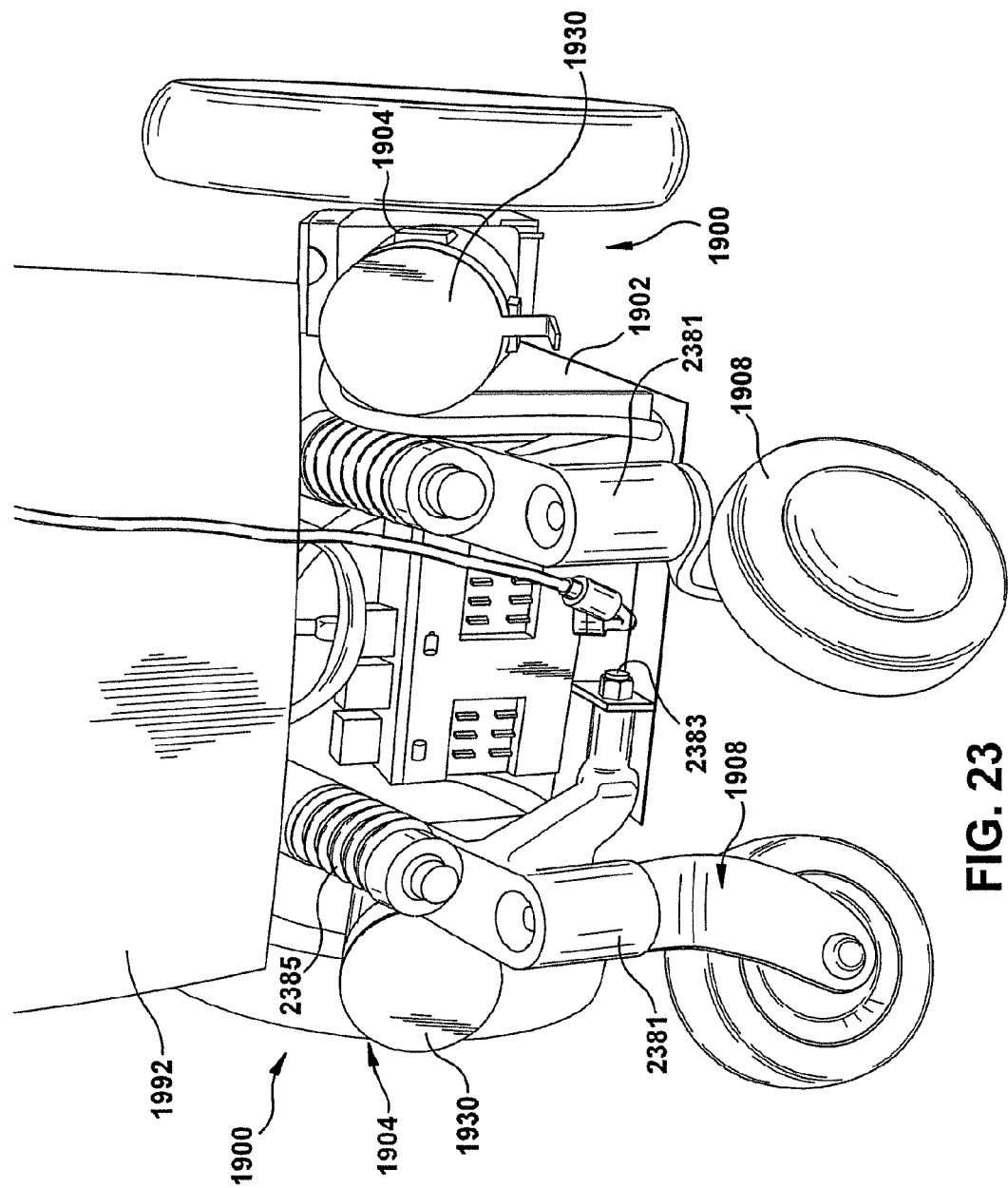
FIG. 23 is an enlarged side view of the of the wheelchair of FIG. 19 showing rear casters.

Referring to FIG. 23, first and second rear casters 1908 are independently, pivotally coupled to the frame 1902. Each rear caster 1908 is coupled to a pivot arm 2381 that is pivotally connected to the frame 1906 at a pivot axis 2383. A rear caster spring 2385 acts between the frame 1902 and the rear caster pivot arm 2381. The rear caster spring 2385 biases the rear caster 1908 into engagement with the ground.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, pivotal connections can be made of any number of structures including bearing assemblies, pins, nuts and bolts, and frictionless sleeve assemblies. Additionally, springs or shock absorbers can be added between pivoting and non-pivoting components to limit, dampen, or somewhat resist the pivotal motions of these components. Therefore, the invention, in its broader aspects, is not limited to the specific details, the representative apparatus, and illustrative examples shown and described.

Accordingly, departures can be made from such details without departing from the spirit or scope of the applicant's general inventive concept.

What is claimed:

1. A wheelchair suspension comprising:
   a frame;
   a drive assembly pivotally mounted to the frame at a first pivot axis;
   at least one caster pivot arm pivotally mounted to the frame and coupled to the drive assembly;
   a variable length motion transfer member coupled to the drive assembly and the at least one caster pivot arm such that motion of the drive assembly is transferred to the at least one caster pivot arm by the variable length motion transfer member; a front caster coupled to the at least one caster pivot arm;
   wherein torque applied by the drive assembly extends the variable length motion transfer member to a maximum length.

2. The wheelchair suspension of claim 1 wherein the at least one caster pivot arm is pivotally mounted to the frame at a second pivot axis and the first pivot axis is in front of the second pivot axis on the frame.

3. The wheelchair suspension of claim 1 wherein variable length motion transfer member is a shock absorber.

4. The wheelchair suspension of claim 1 wherein the variable length motion transfer member comprises a spring.

5. The wheelchair suspension of claim 1 wherein the drive assembly is mounted to a drive assembly pivot arm that is pivotally mounted to the frame at a first pivot axis and at least one caster pivot arm is pivotally mounted to the frame at a second pivot axis and the first pivot axis is in front of the second pivot axis on the frame.

6. The wheelchair suspension of claim 1 wherein the drive assembly pivot arm is pivotally connected to the frame at a first pivot axis and the at least one front caster pivot arm comprises first a first caster pivot arm pivotally coupled to the frame at a second pivot axis and second front caster pivot arm pivotally coupled to the frame at a third pivot axis.

* * * * *